US006943839B1

(12) United States Patent  
Matsumoto et al.

(10) Patent No.: US 6,943,839 B1  
(45) Date of Patent: Sep. 13, 2005

(54) PHOTOGRAPHIC METHOD AT TIME OF SELF-PHOTOGRAPHY, AND IMAGE SENSING APPARATUS THEREOF

(75) Inventors: Toshiyuki Matsumoto, Kawasaki (JP); Kyoji Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/075,885

(22) Filed: May 11, 1998

(30) Foreign Application Priority Data

May 16, 1997 (JP) .................................. 9-127007  
Jul. 2, 1997 (JP) .................................. 9-176921

(51) Int. Cl.[7] ........................ H04N 5/222; H04N 5/262; H04N 5/232; H04N 5/235
(52) U.S. Cl. ...................... 348/333.01; 348/240.99; 348/345; 348/362
(58) Field of Search ................... 348/333.01, 221.1, 348/240.99, 240.2, 240.3

(56) References Cited

U.S. PATENT DOCUMENTS 5,323,203 A * 6/1994 Maruyama et al. ......... 354/410  
5,363,165 A * 11/1994 Kawasaki et al. ...... 354/195.12  
5,442,453 A * 8/1995 Takagi et al. ............... 348/375  
5,737,646 A * 4/1998 Nakajima et al. ........... 396/101

* cited by examiner

Primary Examiner—Wendy P. Garber  
Assistant Examiner—Luong T. Nguyen  
(74) Attorney, Agent, or Firm—Morgan & Finnegan, LLP

(57) ABSTRACT

An image sensing apparatus provides optimum video not only during ordinary shooting but also when the photographer faces the camera to shoot video of him/herself. When the photographer performs such self-photography, the subject (i.e., the photographer) is situated at the center of the scene. Accordingly, in order to eliminate the effects of a peripheral spot-lighted subject or the like, a photometry area used for automatic exposure control or automatic focusing is narrowed to a central portion more at the time of self-photography than at the time of ordinary photography. This provides video having proper exposure without influence from peripheral brightness such as a spotlight. Further, when self-photography is sensed, the magnification of a sensed image by a zoom lens is controlled to the vicinity of a wide-angle limit and the distance to the subject, which is controlled by a focusing lens, is controlled to a short distance in front of the image sensing apparatus.

32 Claims, 26 Drawing Sheets

AT TIME OF SELF-PHOTOGRAPHY

ORDINARY PHOTOGRAPHY — PHOTOMETRY AREA

SELF-PHOTOGRAPHY — PHOTOMETRY AREA

FIG. 4A

ORDINARY PHOTOGRAPHY

| AE EVALUATION VALUE OF EACH AREA | WEIGHTING COEFFICIENT (k) |
|---|---|
| a1 · a2 · a3 · a4 · a5<br>a6 · a10 · a11 · a15<br>a16 · a20 · a21 · a22<br>a23 · a24 · a25 | 0.8 |
| a7 · a8 · a9<br>a12 · a13 · a14<br>a17 · a18 · a19 | 1.0 |

FIG. 4B

SELF-PHOTOGRAPHY

| AE EVALUATION VALUE OF EACH AREA | WEIGHTING COEFFICIENT (k) |
|---|---|
| a1 · a2 · a3 · a4 · a5<br>a6 · a10 · a11 · a15<br>a16 · a20 · a21 · a22<br>a23 · a24 · a25 | 0.1 |
| a7 · a8 · a9<br>a12 · a14<br>a17 · a18 · a19 | 0.8 |
| a13 | 1.0 |

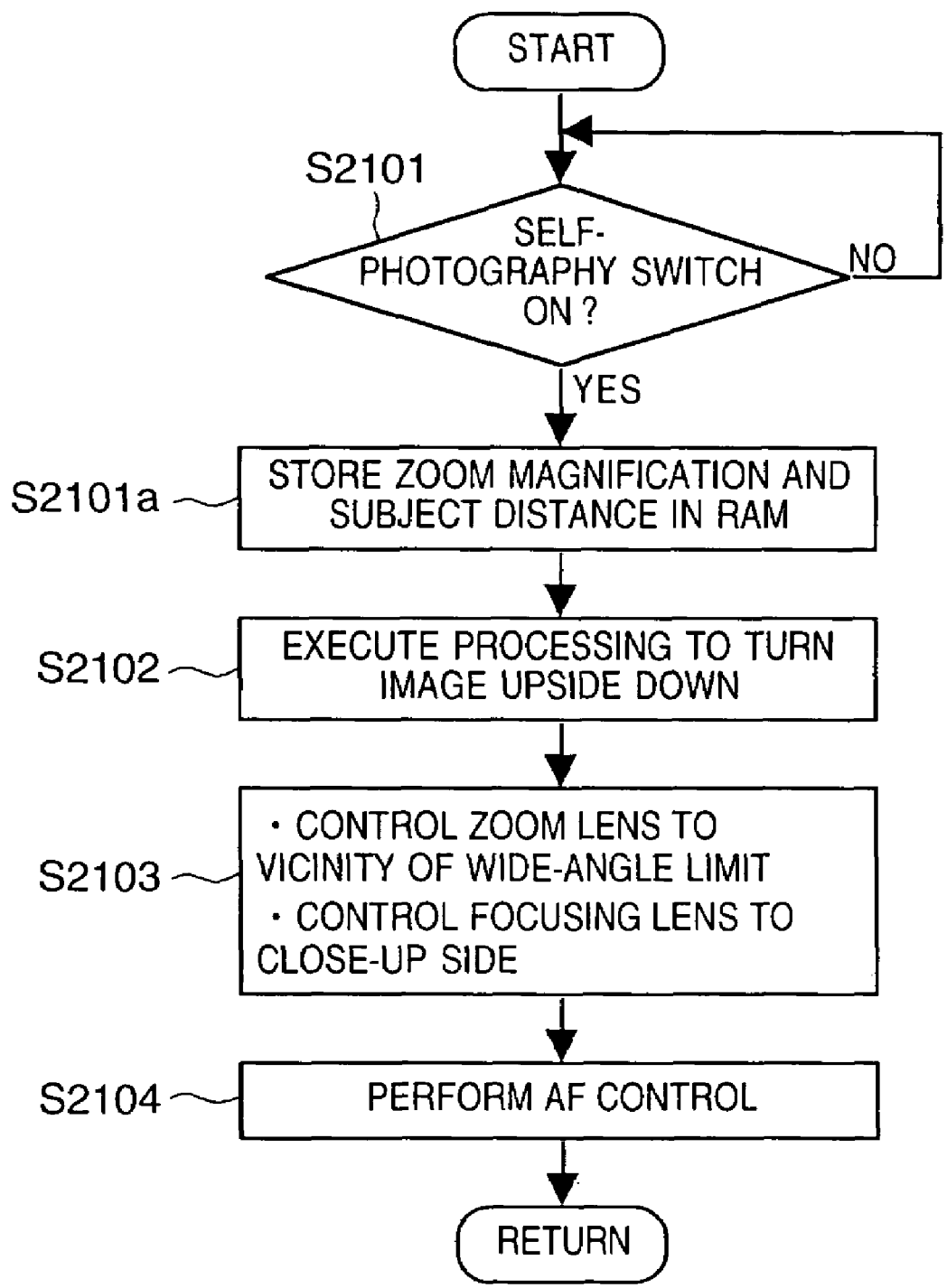

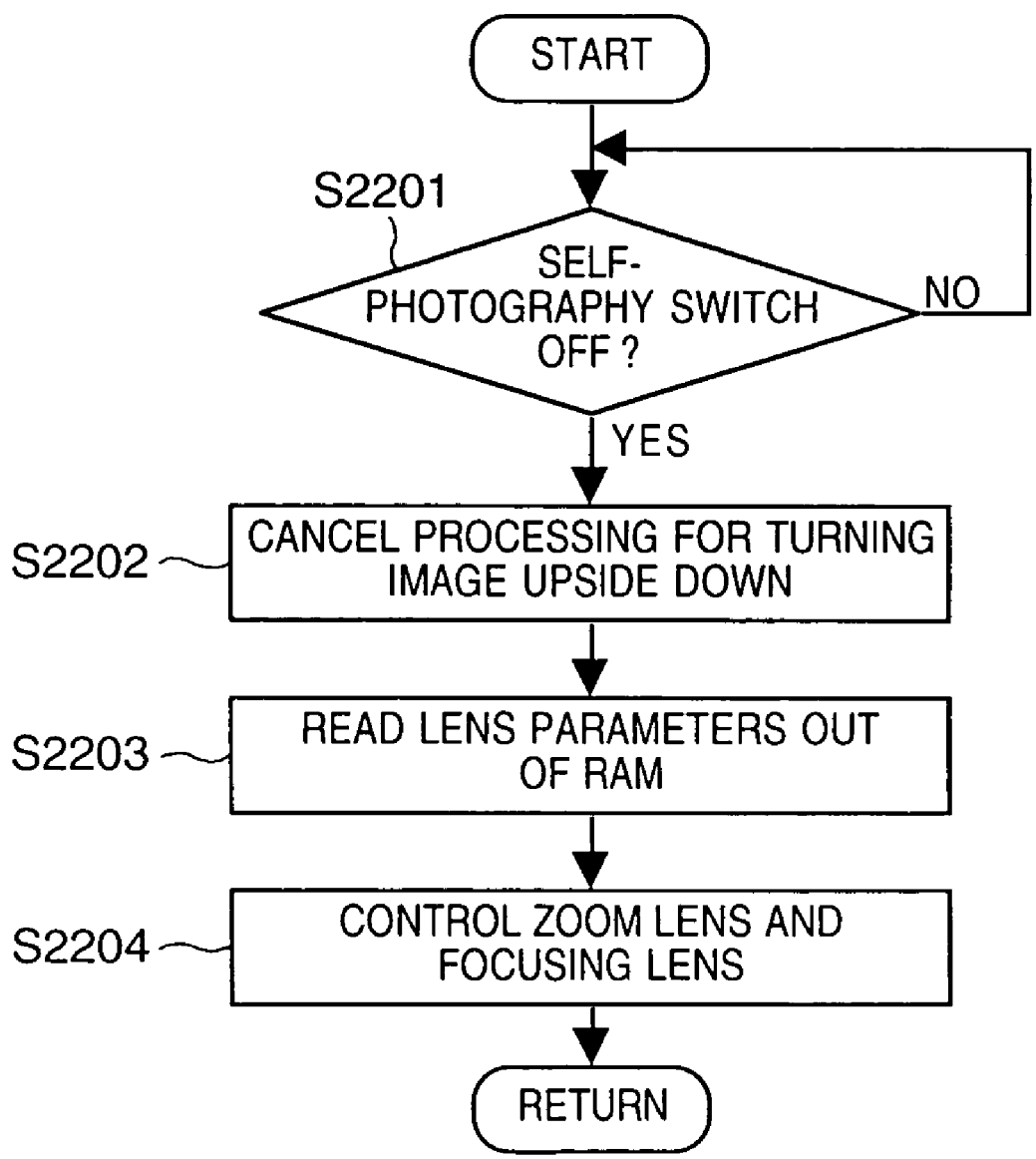

WHEN MAIN SUBJECT IS IN FOCUS

AF PHOTOMETRY AREA

WHEN BACKGROUND IS IN FOCUS

AF PHOTOMETRY AREA

FIG. 25A
AT TIME OF ORDINARY PHOTOGRAPHY
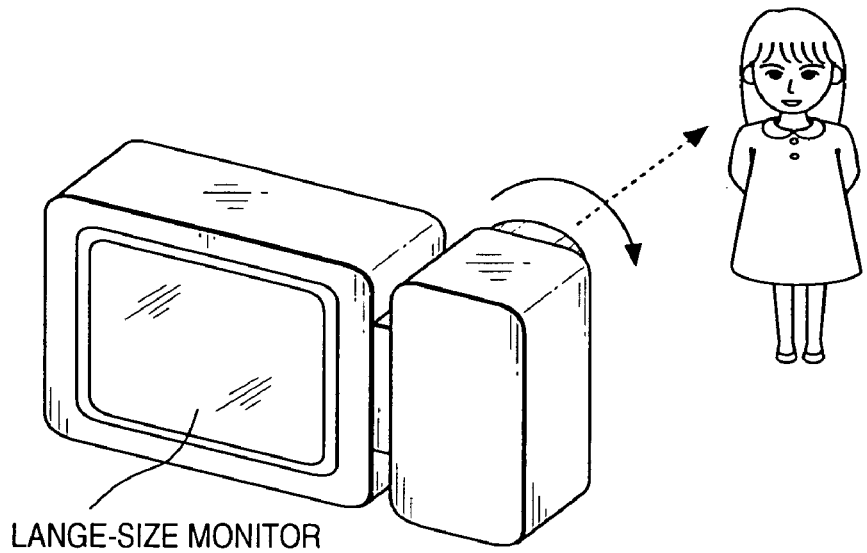
LANGE-SIZE MONITOR
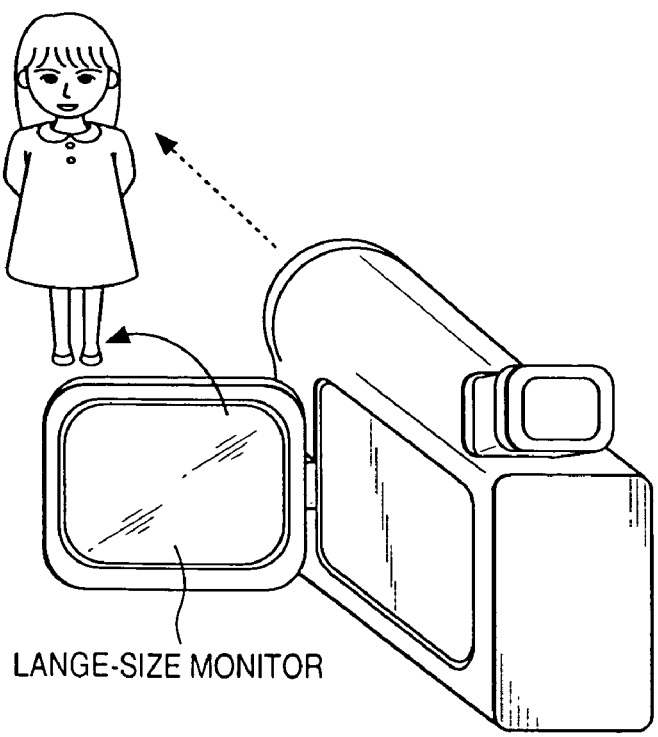
LANGE-SIZE MONITOR

FIG. 25B
AT TIME OF SELF-PHOTOGRAPHY
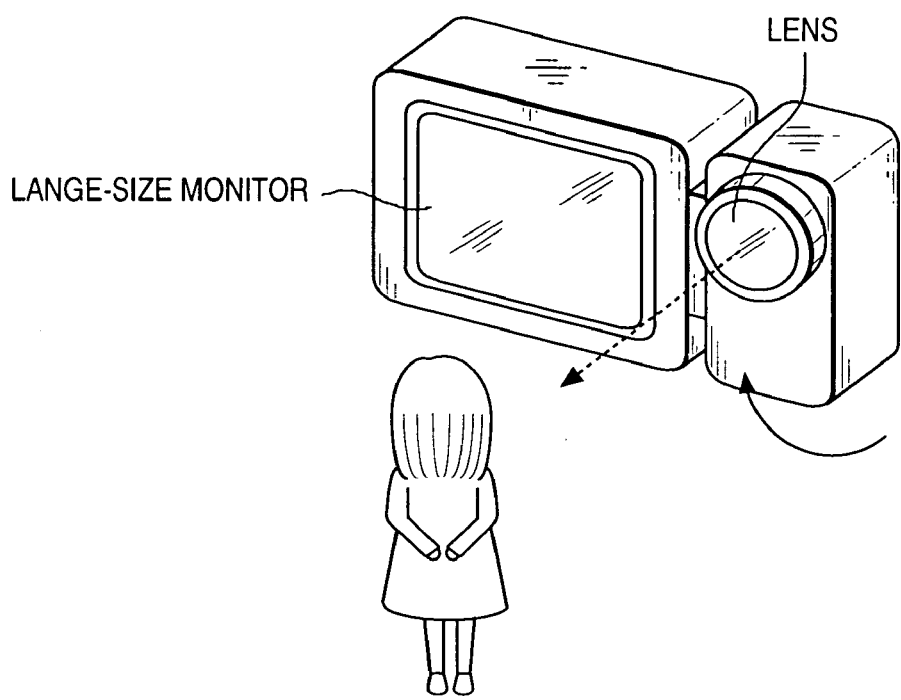
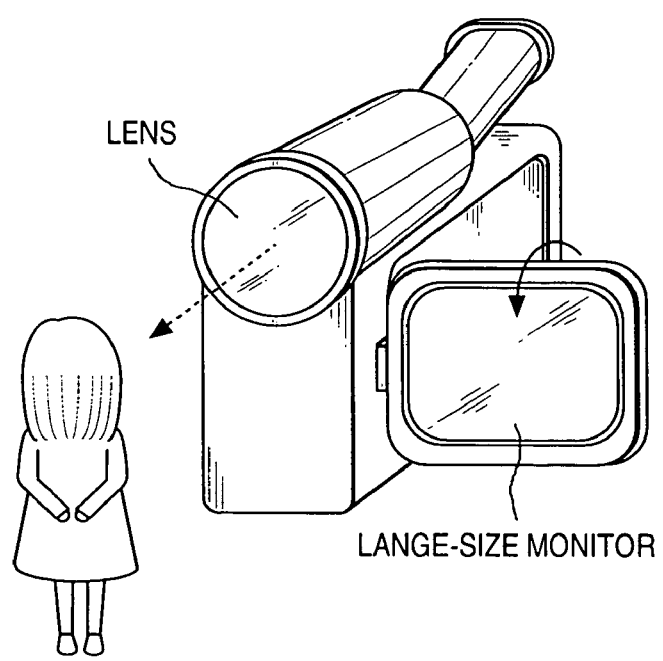

PHOTOGRAPHIC METHOD AT TIME OF SELF-PHOTOGRAPHY, AND IMAGE SENSING APPARATUS THEREOF

BACKGROUND OF THE INVENTION

This invention relates to an image sensing apparatus such as a video camera or digital still camera and, more particular, to self-photography in which the photographer faces the apparatus to shoot video of him/herself.

The construction and operation of an image sensing apparatus according to the prior art will be described with reference to the block diagram of FIG. 16.

The image sensing apparatus shown in FIG. 16 includes a lens group 1 for forming the image of a subject. The lens group 1 constructs a zoom lens having a stationary first lens group 101, a variable power lens 102 for varying power, a stationary second lens group 103 and a focus compensating lens (referred to as a "focusing lens" below) 104 having a function for correcting movement of the focal plane that accompanies zooming and a function for focusing. A zoom lens motor 3 drives the variable power lens 102 of the zoom lens 1 to decide the zoom position, and a variable power lens drive unit 7 drives the variable lens motor 3. A zoom lens drive unit 4 drives the zoom lens motor 3. A focusing lens motor 7 drives the focusing lens 104 of the zoom lens 1 to perform focusing, and a focusing lens drive unit 8 drives the focusing motor 7. A diaphragm mechanism 2 such as a diaphragm blade mechanism controls the amount of incident light, a diaphragm mechanism drive motor 5 drives the diaphragm mechanism 2, and a diaphragm mechanism drive unit 6 drives the diaphragm mechanism drive motor 5. An image sensing device 9 converts incident light to an electric signal. A CDS/AGC unit 10 performs automatic gain control (referred to as "AGC" below) for sampling the signal obtained from the conversion by the image sensing device 9 and amplifying the signal electrically. An analog-digital converter (referred to as an "A/D converter" below) 11 converts the analog signal output of the CDS/AGC unit 10 to a digital signal. A camera signal processor 12 generates a standard television signal by subjecting the signal from the A/D converter 11 to processing such as a gamma correction, color separation and color-difference matrix. A digital/analog converter (referred to as a "D/A converter" below) 13 converts the output signal of the camera signal processor 12 from a digital to an analog signal. A monitor 14 is for checking the video of the subject photographed by the photographer, an AE evaluation value processor 15 obtains an evaluation value, which is for exposure control, from the video signal produced by the camera signal processor 12, and an AF value evaluation processor 16 obtains an evaluation value, which is for performing focusing control, from the video signal produced by the camera signal processor 12. A microcomputer 19 executes the processing of an exposure controller for controlling exposure by controlling the diaphragm mechanism 2 and the gain of the CDS/AGC unit 10 and the processing of focus controller for focusing the image of the subject, which is formed on the surface of the image sensing device, by controlling the focusing lens 104.

The image sensing apparatus having the construction described above is equipped with an image sensing assist mechanism that makes it possible to obtain the optimum medium video automatically or through a simple photographic operation. It should be noted that the term "automatic" is used here and in the claims to include the meaning of a semiautomatic operation "to obtain the optimum medium video through a simple photographic operation".

The image sensing assist mechanism includes an automatic exposure control unit (referred to as an "AE control unit" below) for automatically optimizing the constantly changing state of brightness of the subject being photographed, and an auto-focus control unit (referred to as an "AF control unit" below) for automatically focusing on the subject. These units will be described next.

The AE control unit will be described first.

The AE control unit uses a known method for sensing exposure based upon the video signal representing the subject, adjusting the amount of light incident upon the image sensing device 9 by the diaphragm mechanism 2 so as to optimize exposure, and controlling the gain of the video signal by the AGC means of the CDS/AGC unit 10 so that any change in brightness can be corrected for automatically.

The AE control in accordance with the arrangement of FIG. 16 is performed by the AE control unit of the microcomputer 19 in accordance with a control flowchart shown in FIG. 17.

Operation will now be described in accordance with the control flowchart of FIG. 17.

The AE evaluation value obtained by the AE evaluation value processor 15 is detected at step S901. The AE evaluation value is obtained by sensing, from the video signal produced by the camera signal processor 12, a change in the brightness of the subject. The AE evaluation value processor 15 senses exposure over the full area of the video, which impinges on the image sensing device 9, so as to optimize the exposure of the subject being photographed under a variety of photographic conditions.

Next, at step S902, the current state of exposure based upon the AE evaluation value detected at step S901 is compared with a reference value representing a preset exposure state considered to be optimum, it is determined whether the current state of exposure is optimum or not and, if exposure is improper, the amount of error with respect to the reference value is detected. If the proper exposure has been attained ("YES" at step S902), the current exposure control value is output as is. If exposure is improper ("NO" at step S902), then the diaphragm mechanism 2 or CDS/AGC unit 11 is controlled in conformity with the amount of error and a control value that will cause the current state of exposure to become the reference value is calculated. This will be described taking as an example a case in which exposure control is carried out in accordance with the program diagram shown in FIG. 18.

Consider photography in sufficient illumination such as outdoors (area B in FIG. 18). If AGC is fixed at a low gain (0 dB in FIG. 18) at step S906 and the brightness of the subject changes, a control value by which the diaphragm mechanism 2 compensates for the amount of error detected at step S902 is calculated and the iris of the diaphragm mechanism 2 is opened or closed to regulate the amount of light that impinges upon the image sensing device 9, thereby controlling the state of exposure in optimum fashion. If the subject darkens, the diaphragm mechanism 2 is opened fully (area A in FIG. 18) and exposure control can no longer be performed by the diaphragm mechanism 2, then the diaphragm mechanism is fixed in the fully open state at step S904. If the brightness of the subject then changes, then a control value by which the amount of error detected at step S902 is compensated for by AGC gain is calculated and the state of exposure is controlled for optimization by AGC gain.

The thus obtained control value of the diaphragm mechanism 2 or CDS/AGC unit 10 is output at step S907 to update the control value, whereby control for optimizing state of exposure is performed while following up brightness of the subject at all times.

The AF control unit will be described next.

The AF control unit uses a known method for sensing the sharpness of the image of the subject from the video signal and controlling the focusing lens position so as to maximize sharpness, thereby achieving focusing. In general, evaluation of sharpness is performed using the intensity of the high-frequency component of the video signal extracted from a bandpass filter or the blurring range detection intensity of the video signal extracted by a differentiating circuit or the like. If the subject has been photographed, these signals usually are small if the subject is out of focus and increase as focusing improves, as illustrated in FIG. 19. The maximum value is attained when the subject is brought into perfect focus. Accordingly, the focusing lens is controlled in such a manner that when the sharpness signal is small, the lens is moved rapidly in a direction that will enlarge the signal. As the signal increases, the lens is moved slowly and is halted precisely at the peak of the curve to obtain a focused image. The method of automatic focusing generally is referred to as the hill climbing method (referred as "hill-climbing AF" below).

Hill-climbing AF control in accordance with the arrangement of FIG. 16 will be described with reference to the control flowcharts of FIGS. 20 through 23 the processing of which is performed by the AF control unit of the microcomputer 19.

The AF evaluation value is acquired from the AF value evaluation processor 16 at step S1201 in FIG. 20 and the currently prevailing AF mode is discriminated at step S1202.

In restart discrimination processing, a value held at transition to a restart discrimination mode is compared with the AF evaluation value at step S1301 in FIG. 21. If it is found at step S1302 that the difference between the held value and the AF evaluation value is greater than a predetermined value, a transition is made to direction discrimination processing. If the difference is larger than the predetermined value, then processing is terminated.

In direction discrimination processing, wobbling is performed at step S1401 in FIG. 22 to oscillate the focusing lens 104 back and forth, thereby determining whether the image is in or out of focus and, if out of focus, the direction in which the lens should be moved to obtain the focused state. If the image is out of focus, control returns to the hill-climbing processing mode at step S1406. If the image is in focus, then control returns to the restart discrimination mode at step S1404.

In hill-climbing processing, the AF evaluation value is subjected to a peak holding operation at step S1501 in FIG. 23. Specifically, if the AF evaluation value is greater than the current peak value, then this value is adopted as the new peak value. If it is greater than the focusing lens position, this value is adopted as the new peak value and this focusing lens position is held. Next, it is determined at step S1502 whether the AF evaluation value is greater than the initial hill-climbing value held at step S1407 in FIG. 22. Processing is terminated if the AF evaluation value is not less than the peak value. If the AF evaluation is less than the peak value, then processing for returning to the focusing lens position of the peak value is executed at step S1504 and then it is determined at step S1505 whether the position has returned to the focusing ring position of the peak value. Control shifts to direction discrimination processing at step S1506 if the position has returned to the focusing ring position of the peak value; otherwise, processing is terminated. If it is found at step S1502 that the AF evaluation value is less than the initial hill-climbing value, then the hill-climbing direction is reversed and the focusing lens is driven in the opposite direction. This is followed by step S1508, at which the initial hill-climbing value is updated to the current AF evaluation value.

Thus, control is performed to move the focusing lens and maximize the AF evaluation value while repeating restart discrimination processing, direction discrimination processing and hill-climbing processing, whereby video in which the subject is in focus at all times is obtained.

In an image sensing apparatus such as a video camera having a photography assist mechanism such as the AE control unit and AF control unit, the conventional practice is to use an electronic viewfinder (referred to as an "EVF" below), which enlarges the video of a small-size CRT or liquid crystal panel by an optical enlargement unit such as an enlarging lens, as a monitor for verifying the video being captured by the photographer. Typically, the photographer shoots a scene while observing video that appears in the EVF by way of a configuration in which the display screen of the EVF is arranged to point in a direction opposite that of the lens, as illustrated in FIG. 24A.

An image sensing apparatus proposed in the recent past has a structure of the kind shown in FIG. 24B, in which the apparatus is provided with a monitor (referred to as a "large-size monitor" below) that allows the photographer to verify video by direct viewing using a large-size liquid crystal panel without relying upon an optical enlargement unit, or of the kind shown in FIG. 24C, in which the apparatus is provided with both an EVF and a large-size monitor.

With the image sensing apparatus equipped with the large-size monitor, ordinarily photography is performed in a state in which the display screen of the large-size monitor is faced in a direction opposite that in which light from the subject impinges upon the image sensing lens, as shown in FIG. 25A. However, unlike the EVF, the large-size monitor allows the photographer to verify the video on the monitor even if the photographer does not look directly at the screen. Accordingly, there has been proposed a structure that makes possible so-called self-photography. Specifically, as shown in FIG. 25B, the display screen of the large-size monitor is pointed in a direction the same as that in which light from the subject impinges upon the image sensing lens, thereby allowing the photographer to shoot video of himself or herself while observing the image on the large-size monitor, as illustrated in FIG. 26.

When self-photography is performed, AE, AF control that follows up the subject is performed by the AE control unit and AF control unit in the same manner as when ordinary photography is carried out, thereby providing the optimum video.

Control of the photography assist mechanism such as the AE control unit and AF control unit is control premised on the photographic conditions that prevail during ordinary photography. In self-photography, however, proper control is not always performed because the photographic conditions differ from those of ordinary photography.

For example, at the time of ordinary photography, the AE control unit achieves a certain degree of optimization in a variety of brightness conditions by taking into consideration not only scenes in which the entire picture has a uniform brightness but also back lighted scenes and scenes illuminated by spotlight, and control is performed quickly in response to a change in the brightness of the subject. With self-photography, however, the photographer shoots video of himself or herself while observing the video on the large-size monitor. Consequently, there is little change in the brightness of the main subject. When AE control similar to that at the time of ordinary photograph is performed, the camera reacts too sensitively to changes in the brightness of peripheral subjects, thereby causing a change in the brightness of the main subject.

In regard to the AF control unit, control at the time of ordinary photography is carried out so as to achieve focusing from close-up photography, in which the distance to the subject is less than one meter, to photography in which the subject distance is near infinity, as in the case of a landscape. Ina case where a nearby subject is present within an AF photometry area used to detect the AF evaluation value, the camera will focus on the main subject if the main subject is photographed predominantly at the center of the screen, as shown in FIG. 15A. However, if the camera is erroneously focused on the background in a case where the main subject has shifted from the center of the screen because of hand movement of the photographer or temporary movement of the main subject at the time of photography, as shown in FIG. 15B, the main subject at the time of self-photography will become much more blurred than at the time of ordinary photography because the distance to the main subject is approximately one meter.

Thus, when control of the photography assist mechanism such as the AE and AF units for dealing with a wide range of photographic conditions is performed in the same manner as at the time of ordinary photography when self-photography is carried out using an image sensing apparatus having a large-size monitor, often the video obtained is not that intended by the photographer.

SUMMARY OF THE INVENTION

The present invention has been devised in view of these circumstances and a first object thereof is to provide an image sensing apparatus in which the optimum video can be obtained not only at the time of ordinary photography but also at the time of self-photography.

According to the present invention, the foregoing object is attained by providing an image sensing apparatus having a construction in accordance with (1) through (5) below.

(1) There is provided an image sensing apparatus having a lens for forming an image of a subject, a monitor in which direction of a display can be changed relative to a direction in which light from the subject impinges upon the lens, and a photography assist mechanism for adjusting photographic conditions automatically, wherein at the time of self-photography, in which the direction in which light impinges upon the lens and the display direction of the monitor agree, the photography assist mechanism is capable of performing control different from that at the time of other, ordinary photography.

(2) The photography assist mechanism has automatic exposure control means which, at the time of self-photography, performs control by a photometry method different from that at the time of ordinary photography.

(3) At the time of self-photography, the automatic exposure control means makes response slower than that at the time of ordinary photography.

(4) The photography assist mechanism has automatic focus control means which, at the time of self-photography, performs control through a sequence different from that at the time of ordinary photography.

(5) At the time of self-photography, the automatic focus control means makes response slower than that at the time of ordinary photography.

A second object of the present invention is to rapidly obtain an optimum image, even by self-photography using an image sensing apparatus having a zoom function, by executing appropriate processing to implement self-photography, this being accomplished without complicating the operation performed by the photographer.

According to the present invention, the second object is attained by providing an image sensing apparatus having an image sensing device for sensing the image of a subject, a zoom lens for deciding magnification of a sensed image, and a focusing lens for deciding focal point position of the subject whose image is sensed by the image sensing device, the apparatus comprising display means capable of displaying the image sensed by the image sensing device, moving means for moving display direction of the display means to a direction on the side of the subject, sensing means for sensing that the display direction of an image on the display means is being moved to the side of the subject by the moving means, and control means which, if the sensing means has sensed that the display direction of the image on the display means is being moved to the side of the subject, controls the sensed-image magnification of the zoom lens to a wide-angle magnification and controls distance to the subject, which is controlled by the focusing lens, to a short distance in front of the image sensing apparatus.

Further, the control means controls the sensed-image magnification of the zoom lens to the wide-angle limit or to a point near the wide-angle limit, and controls distance to the subject, which is controlled by the focusing lens, to a short-distance limit in front of the image sensing apparatus or to a point near the short-distance limit.

The apparatus further comprises magnification setting means for setting the sensed-image magnification controlled by the control means, and subject-distance setting means for setting a subject distance at which the focusing lens, which is controlled by the control means, is brought into focus.

The apparatus further comprises recording means for recording an image based upon an image signal indicative of an image sensed by the image sensing device, and control inhibiting means for inhibiting control by the control means if an image is being recorded by the recording means.

The apparatus further comprises memory means for storing the sensed-image magnification controlled by the zoom lens, as well as the subject distance controlled by the focusing lens, when the sensing means has sensed that the display direction of the image on the display means is being moved to the side of the subject, wherein when the sensing means no longer senses that the display direction of the image on the display means is being moved to the side of the subject, the control means controls the zoom lens to the sensed-image magnification that has been stored by the memory means and controls the focusing lens to the subject distance that has been stored by the memory means.

The present invention further provides an image sensing apparatus having an image sensing device for sensing the image of a subject, and a zoom lens for deciding magnification of a sensed image, the apparatus comprising display means capable of displaying the image sensed by the image sensing device, moving means for moving display direction of the display means to a direction on the side of the subject, sensing means for sensing that the display direction of the image on the display means is being moved to the side of the subject by the moving means, and control means which, if the sensing means has sensed that the display direction of the image on the display means is being moved to the side of the subject, controls the image magnification of the zoom lens to a wide-angle magnification.

The control means controls the sensed-image magnification of the zoom lens to the wide-angle limit or to a point near the wide-angle limit.

The apparatus further comprises magnification setting means for setting the sensed-image magnification controlled by the control means.

The apparatus further comprises memory means for storing the sensed-image magnification controlled by the zoom lens when the sensing means has sensed that the display direction of the image on the display means is being moved to the side of the subject, wherein when the sensing means no longer senses that the display direction of the image on the display means is being moved to the side of the subject, the control means controls the zoom lens to the sensed-image magnification that has been stored by the memory means.

The present invention further provides an image sensing apparatus having an image sensing device for sensing the image of a subject, and a focusing lens for deciding focal point position of the subject whose image is sensed by the image sensing device, the apparatus comprising display means capable of displaying the image sensed by the image sensing device, moving means for moving display direction of the display means to a direction on the side of the subject, sensing means for sensing that the display direction of the image on the display means is being moved to the side of the subject by the moving means, and control means which, if the sensing means has sensed that the display direction of the image on the display means is being moved to the side of the subject, controls distance to the subject, which is controlled by the focusing lens, to a short distance in front of the image sensing apparatus.

Further, the control means controls distance to the subject, which is controlled by the focusing lens, to a short-distance limit in front of the image sensing apparatus or to a point near the short-distance limit.

The apparatus further comprises subject-distance setting means for setting a subject distance controlled by the focusing lens, which is controlled by the control means.

The apparatus further comprises memory means for storing the subject distance controlled by the focusing lens when the sensing means has sensed that the display direction of the image on the display means is being moved to the side of the subject, wherein when the sensing means no longer senses that the display direction of the image on the display means is being moved to the side of the subject, the control means controls the focusing lens to the subject distance that has been stored by the memory means.

The apparatus further comprises automatic focusing means for executing automatic focusing after the focusing lens has been controlled by the control means.

The subject-distance setting means is capable of setting a subject distance within a range of 10 cm to 1 m.

The present invention further provides an image sensing apparatus having an image sensing device for sensing the image of a subject, and a zoom lens for deciding magnification of a sensed image, the apparatus comprising display means capable of displaying the image sensed by the image sensing device, moving means for moving display direction of the display means to a direction on the side of the subject, sensing means for sensing that the display direction of the image on the display means is being moved to the side of the subject by the moving means, memory means for storing the sensed-image magnification controlled by the zoom lens, as well as the subject distance controlled by the focusing lens, when the sensing means has sensed that the display direction of the image on the display means is being moved to the side of the subject, and control means for controlling the zoom lens to the sensed-image magnification that has been stored by the memory means and the focusing lens to the subject distance that has been stored by the memory means when the sensing means no longer senses that the display direction of the image on the display means is being moved to the side of the subject.

The present invention further provides an image sensing apparatus having an image sensing device for sensing the image of a subject, and a zoom lens for deciding magnification of a sensed image, the apparatus comprising display means capable of displaying the image sensed by the image sensing device, moving means for moving display direction of the display means to a direction on the side of the subject, sensing means for sensing that the display direction of the image on the display means is being moved to the side of the subject by the moving means, memory means for storing the sensed-image magnification controlled by the zoom lens when the sensing means has sensed that the display direction of the image on the display means is being moved to the side of the subject, and control means for controlling the zoom lens to the sensed-image magnification that has been stored by the memory means when the sensing means no longer senses that the display direction of the image on the display means is being moved to the side of the subject.

The present invention further provides an image sensing apparatus having an image sensing device for sensing the image of a subject, and a focusing lens for deciding focal point position of the subject whose image is sensed by the image sensing device, the apparatus comprising display means capable of displaying the image sensed by the image sensing device, moving means for moving display direction of the display means to a direction on the side of the subject, sensing means for sensing that the display direction of the image on the display means is being moved to the side of the subject by the moving means, memory means for storing the subject distance controlled by the focusing lens when the sensing means has sensed that the display direction of the image on the display means is being moved to the side of the subject, and control means for controlling the focusing lens to the subject distance that has been stored by the memory means when the sensing means no longer senses that the display direction of the image on the display means is being moved to the side of the subject.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are diagrams showing an example of photometry for sensing AE evaluation values in ordinary photography and self-photography when a screen is split into areas;

FIG. 10 is flowchart of processing executed when the image sensing apparatus of the third embodiment is used for self-photography;

FIG. 14 is a flowchart of processing executed when the image sensing apparatus of the third embodiment is restored to ordinary photography;

FIGS. 25A, 25B are diagrams useful in describing ordinary photography and self-photography.

DESCRIPTION OF THE PREFERRED EMBODIMENTS

The image sensing apparatus of the present invention will now be described in detail in accordance with preferred embodiments thereof.

The embodiments of the image sensing apparatus are equipped with a large-size monitor. However, in case of an arrangement that performs automatic focusing or an arrangement using an image sensing lens having a fixed focal point, the state of focusing need not be checked on the monitor and only the position of the subject need be confirmed when self-photography is performed. Accordingly, the invention can also be practiced in a form having a small monitor. Further, though the embodiments are for taking moving pictures, this does not impose a limitation upon the invention, which can also be practiced in a form that takes still pictures.

First Embodiment

Figure 1:
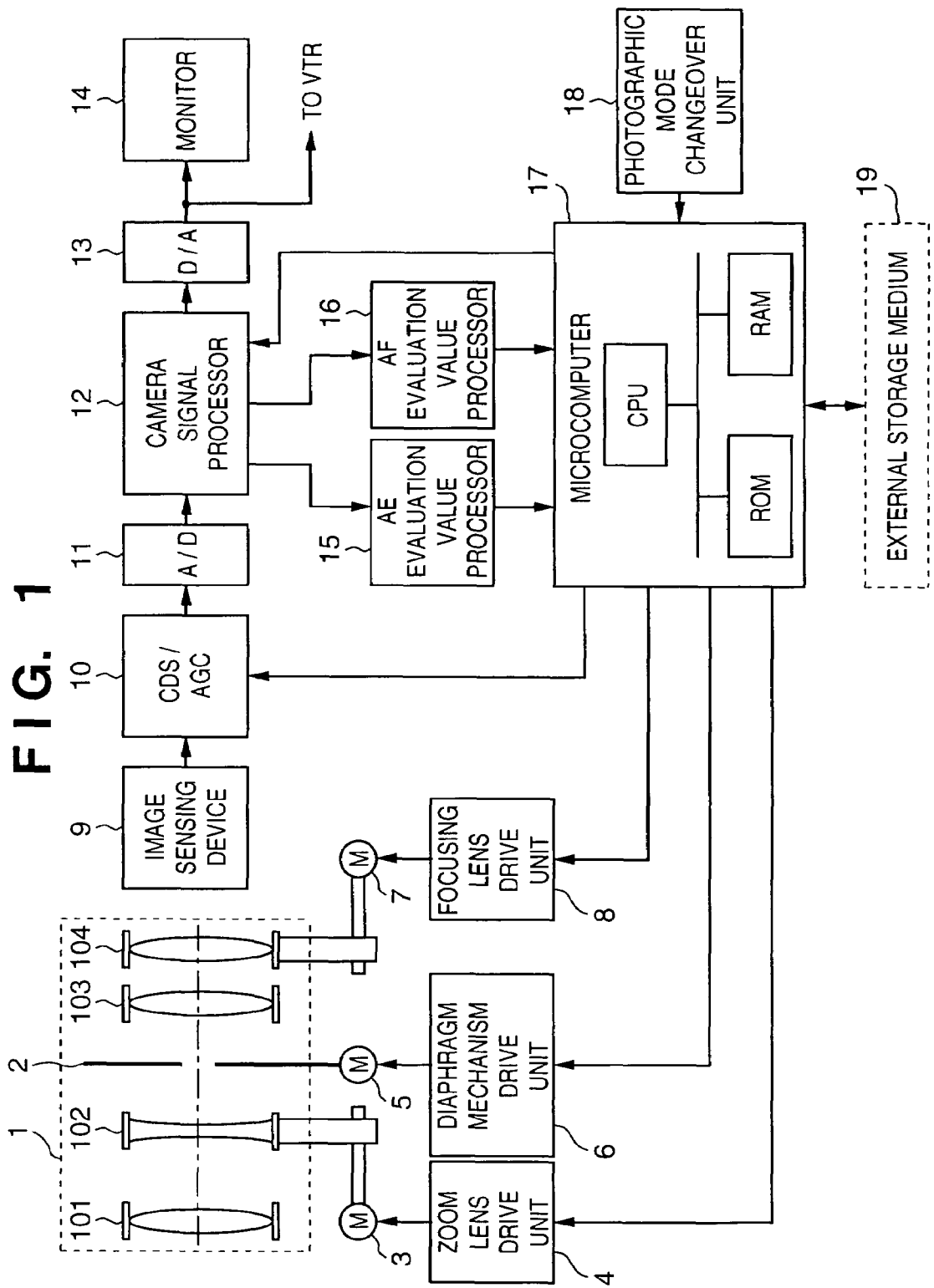
FIG. 1 is a block diagram illustrating the construction of an image sensing apparatus according to a first embodiment of the present invention.
Figure 16:
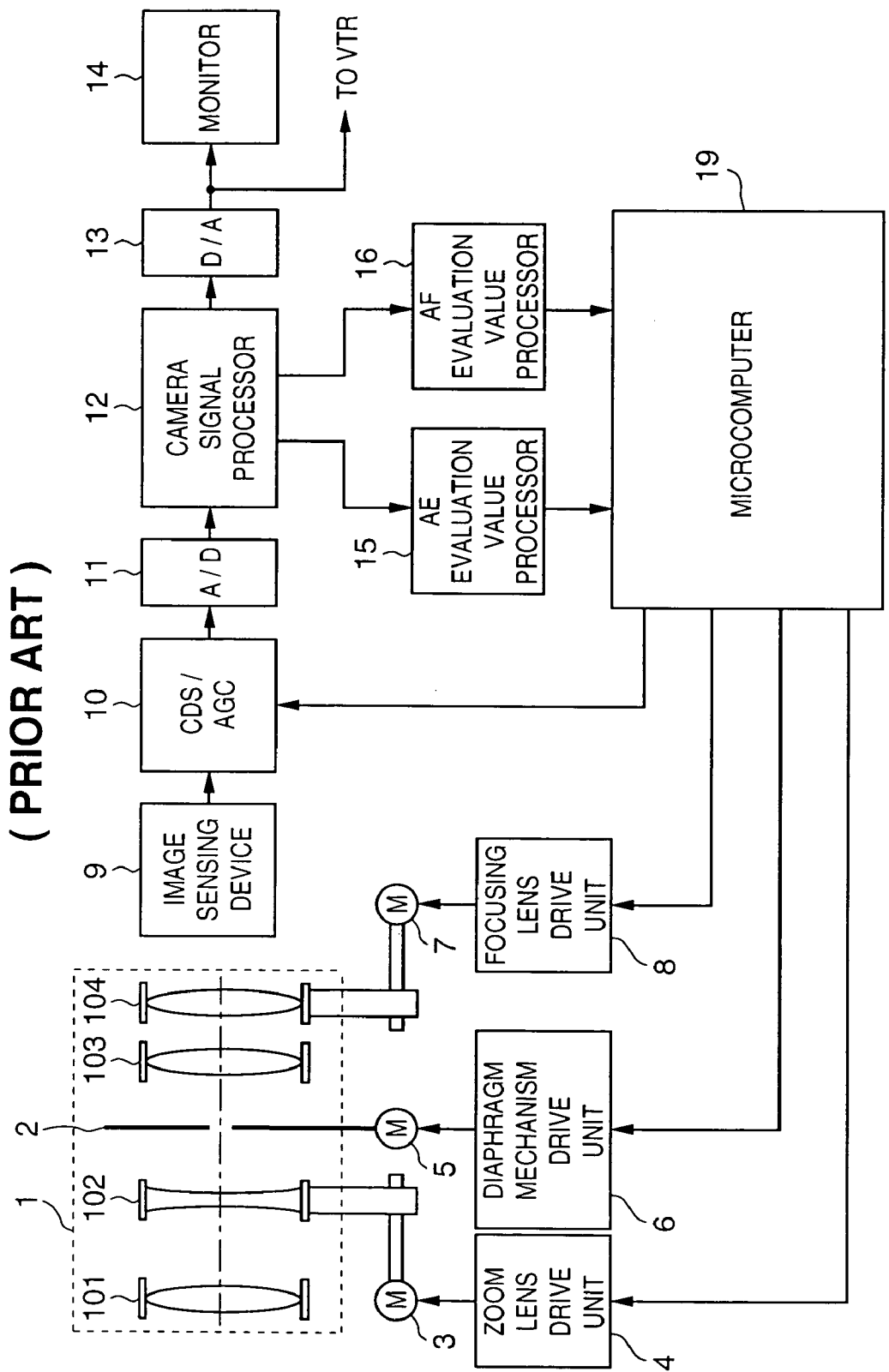
FIG. 16 is a block diagram illustrating the construction of an image sensing apparatus according to the prior art.
Figure 17:
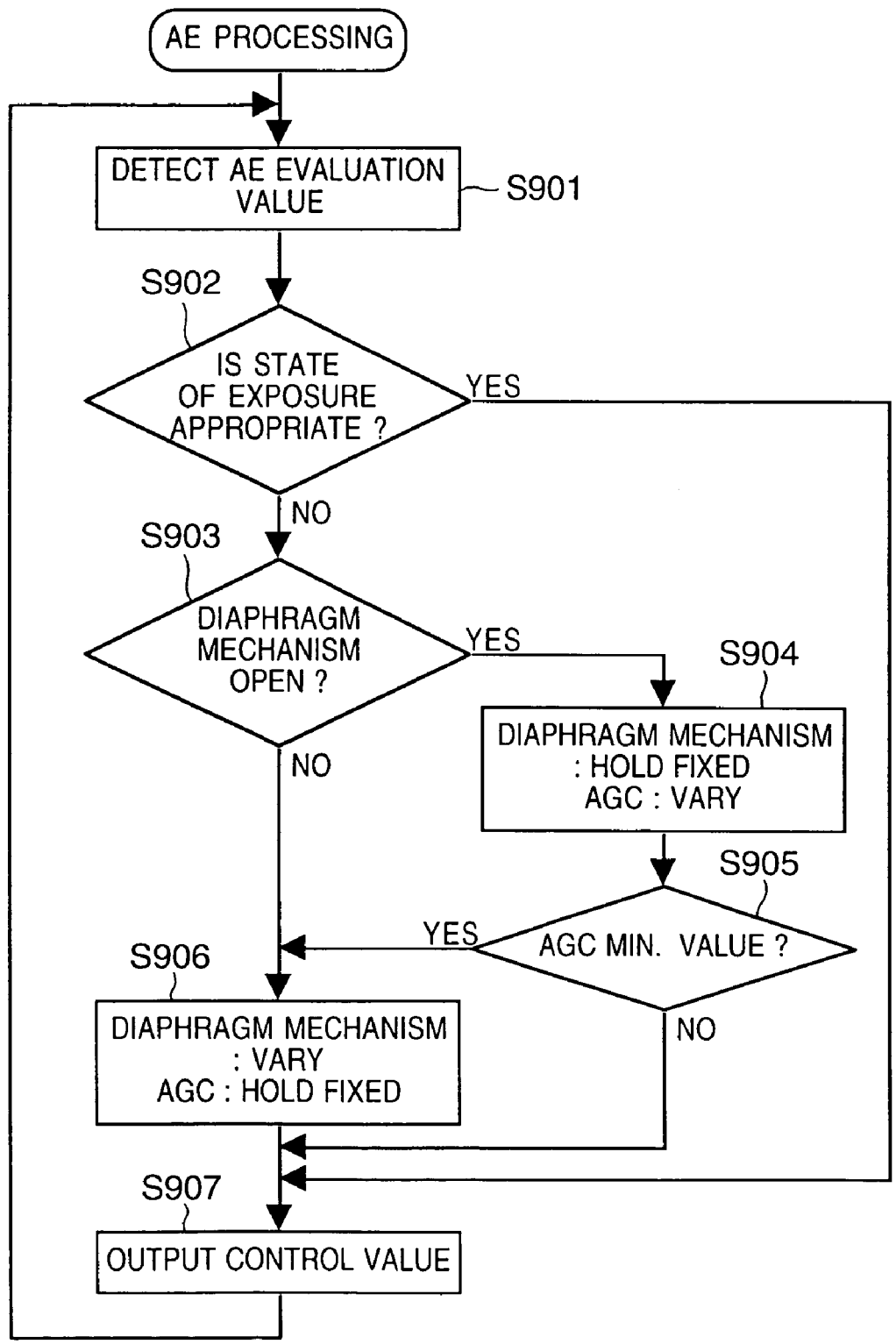
FIG. 17 is a flowchart of AE control in the image sensing apparatus according to the prior art.
Figure 26:
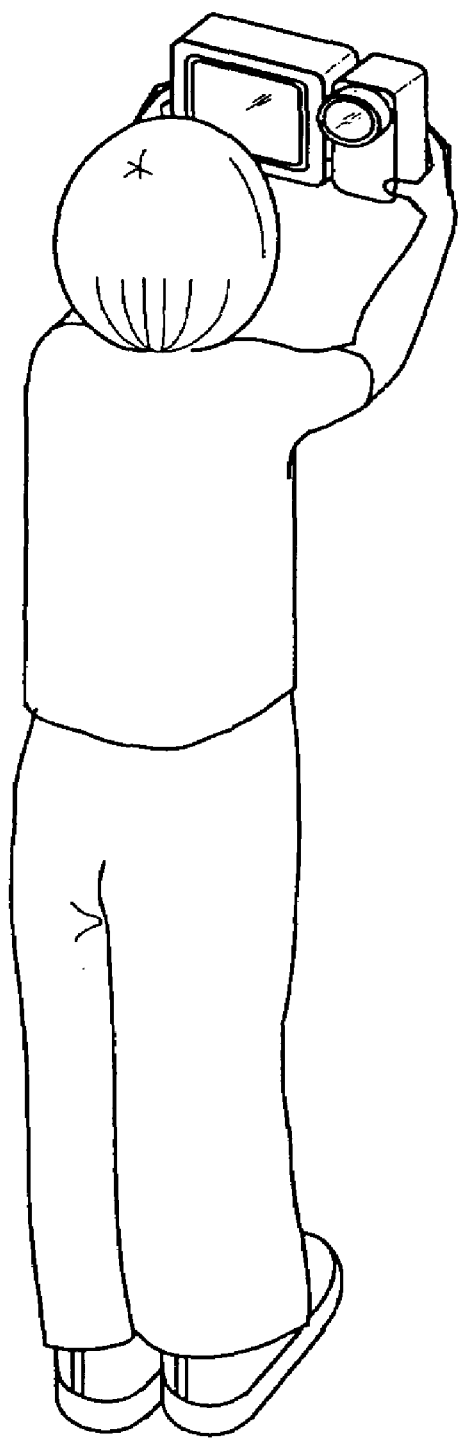
FIG. 26 is a diagram useful in describing self-photography.

FIG. 1 is a block diagram illustrating the construction of an image sensing apparatus according to a first embodiment of the present invention. Components identified by reference characters identical with those of the prior art shown in FIG. 16 have the same functions and the processing of a video signals is performed in similar fashion. This embodiment is additionally provided with a photographic mode changeover unit 18 such as switch means for changing over between ordinary photography and self-photography, and AE control performed by a microcomputer 17 (which includes a CPU, ROM and RAM) is further provided with an AE control function for self-photography. Though this arrangement is premised on a structure in which the lens unit is movable relative to the apparatus body having a fixed monitor, as illustrated in FIG. 26, this does not impose a limitation on the invention and the embodiment can also be practiced in a form in which the monitor is movable relative to the apparatus body having a fixed lens unit.

In self-photography, the photographer generally performs photography at such a distance that he or she can confirm the image appearing on the large-size liquid crystal monitor. This means that the photographer holds the apparatus when shooting or places the apparatus at a suitable location at a total distance of one to two meters to perform photography. As a consequence, the photographic conditions are more limited than when ordinary photography is performed. AE control according to this embodiment is performed in conformity with the above-mentioned photographic conditions that prevail when self-photography is performed, as well as in conformity with ordinary photographic conditions.

Operation in accordance with AE control in this embodiment will be described with reference to the control flowchart of FIG. 2 executed by the microcomputer 17. It should be noted that the program corresponding to this control flowchart is stored in the ROM or RAM and is executed by the CPU. The program may be executed upon being loaded into the RAM from an external storage medium 19 such as floppy disk or CD-ROM.

Figure 3A:
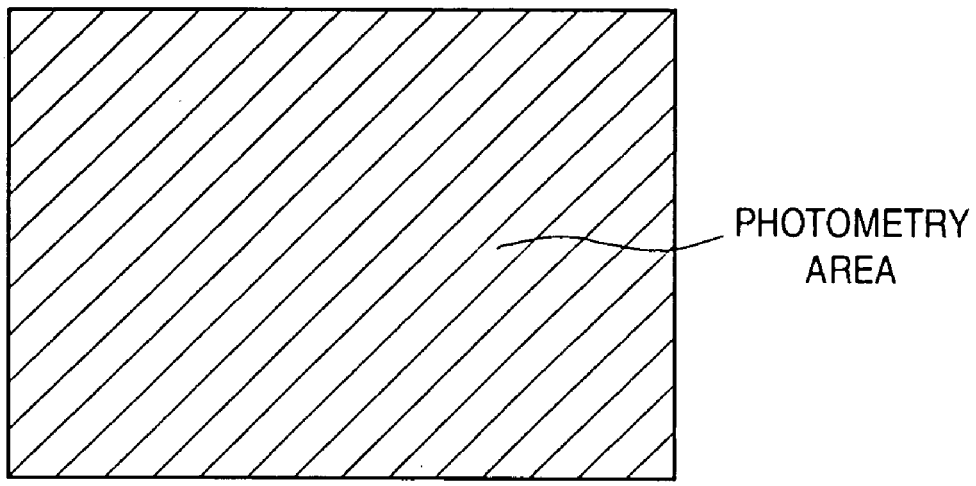
FIGS. 3A and 3B are diagrams showing an example of photometry for sensing AE evaluation values in ordinary photography and self-photography.
Figure 3B:
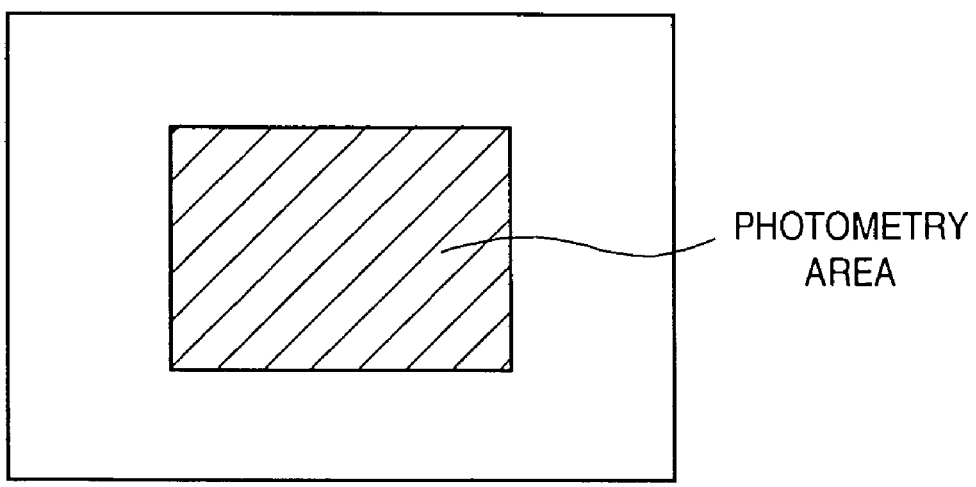

Based upon a detection signal from the photographic mode changeover means 18, it is determined at step S201 whether the prevailing mode is the ordinary photography mode or the self-photography mode. Control proceeds to detection of AE evaluation value at step S202 if the mode is ordinary photography and to detection of AE evaluation value at step S203 if the mode is self-photography. The detection of the AE evaluation values at steps S202, S203 involves sensing a change in the brightness of the subject based upon the video signal from the camera signal processor 12. Detection of the AE evaluation value at the time of ordinary photography at step S202 generally involves photometering of subject brightness over the full screen area, as shown in FIG. 3A. However, detection of the AE evaluation value at the time of self-photography at step S203 mainly involves cases in which the face of the photographer is shot near the center of the screen. Accordingly, only the area at the central portion of the screen is subjected to photometering, as shown in FIG. 3B, to thereby detect the AE evaluation value. In a case where the metered area is split into a plurality of areas and the AE evaluation value of the overall screen is calculated while weighting the AE evaluation values of the respective areas, the weighting of the areas at the time of self-photography is such that the AE evaluation values at the central portion are weighted more that than in the case of ordinary photography (FIG. 4A), as shown in FIG. 4B, as a result of which the detection of AE evaluation values is performed in such a manner that the influence of subject brightness at peripheral portions is made less in the case of self-photography than in the case of ordinary photography.

Figure 18:
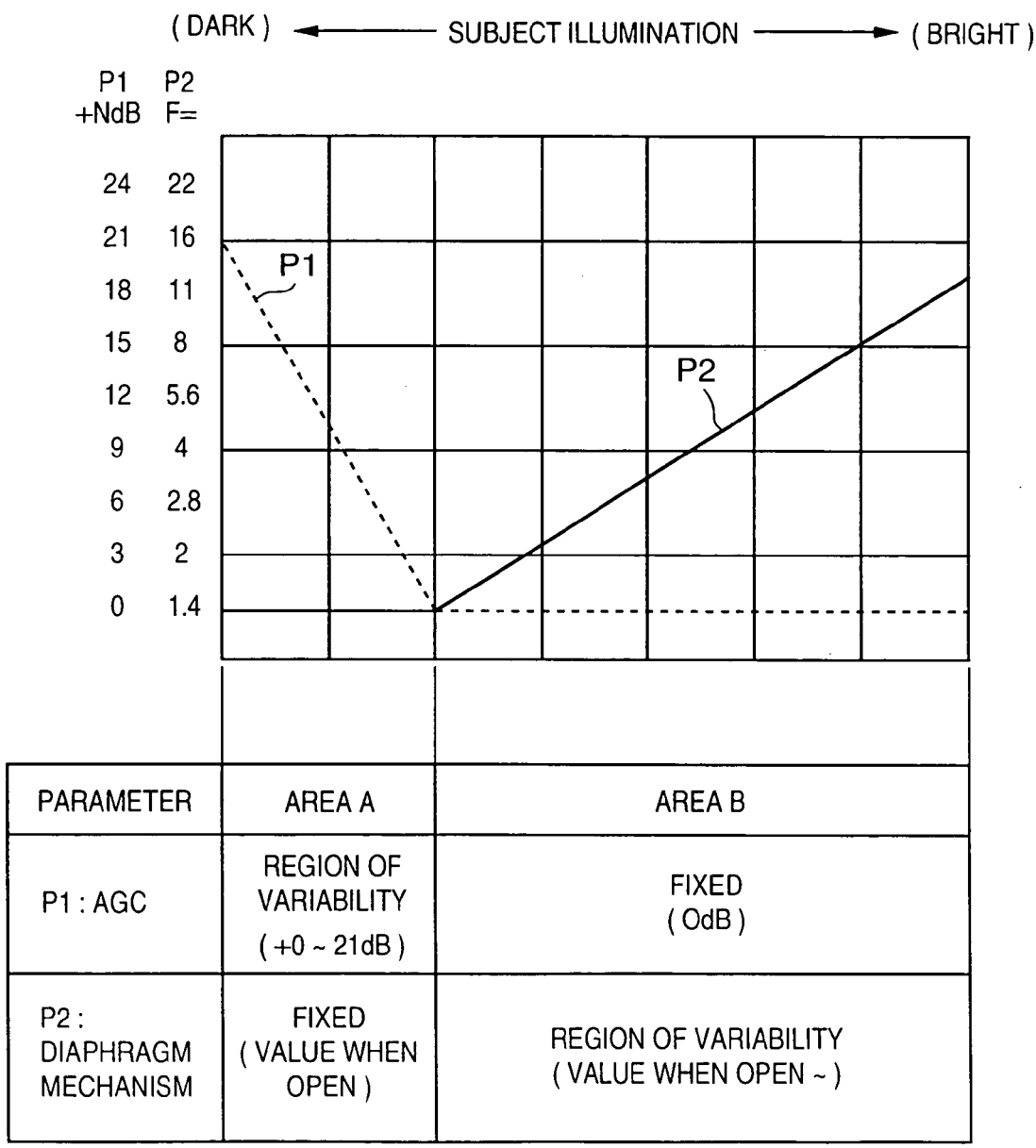
FIG. 18 is a program diagram of AE control in the image sensing apparatus according to the prior art.

Upon this detection of the AE evaluation value, the program proceeds to step S204 as in the prior art. Here exposure is controlled by controlling the diaphragm mechanism and AGC unit in accordance with the program diagram of FIG. 18.

When self-photography is performed, AE control is carried out while performing photometering with greater emphasis on the central portion of the screen than in the case of ordinary photography, as mentioned above. Consequently, even if a spot-lighted subject appears at the periphery, the main subject is not influence and is maintained at the optimum exposure.

Figure 2:
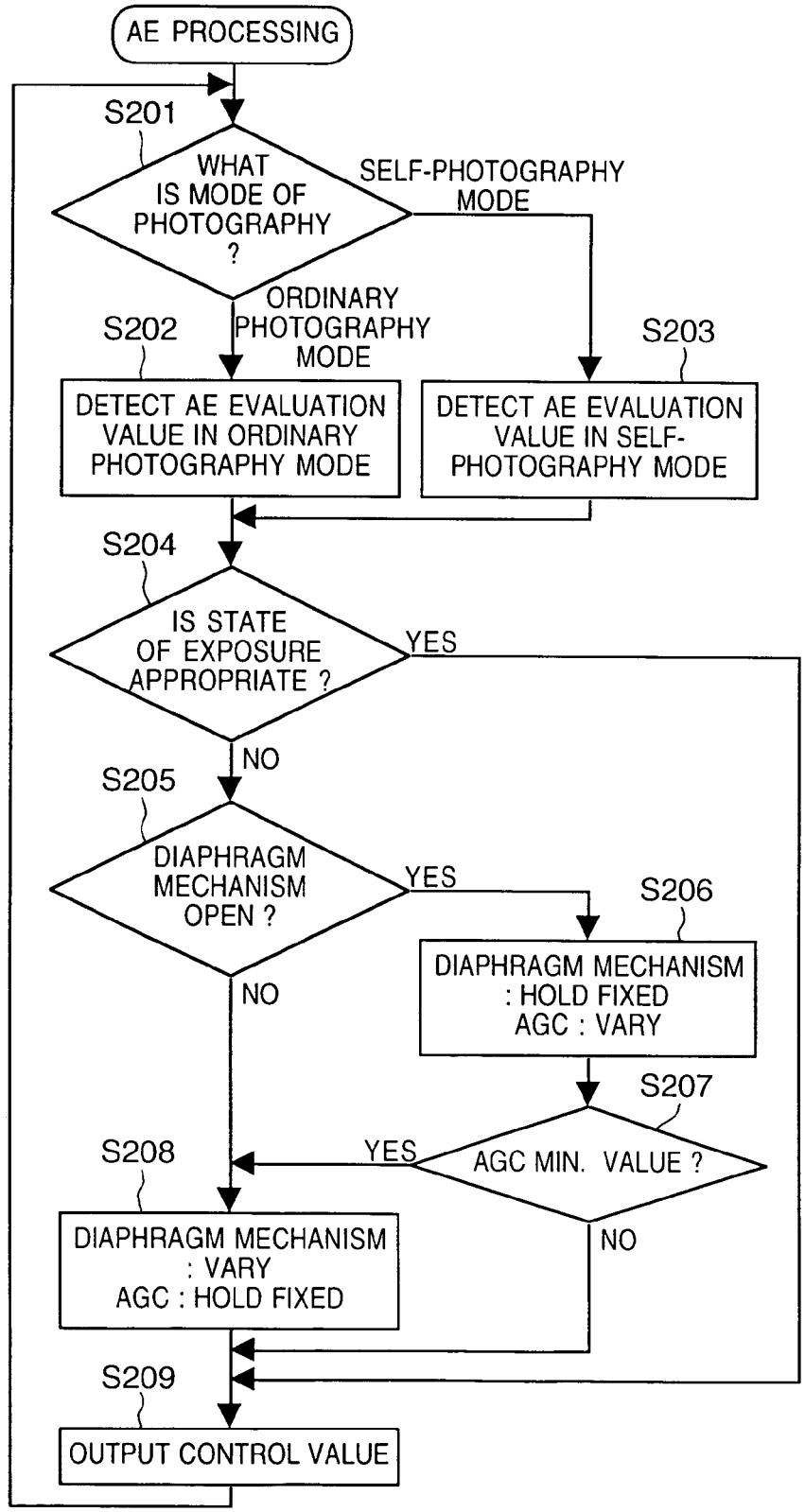
FIG. 2 is a flowchart of AE control in the image sensing apparatus according to the first embodiment.

Besides changing the AE photometering, control may be performed to change the amount of control of the diaphragm mechanism and of AGC gain with respect to a change in subject brightness at steps S206 and S208 in FIG. 2 in such a manner that AE control response is made slower than in the case of ordinary photography. As a result, even if the main subject has shifted from the center of the screen because of hand movement of the photographer or temporary movement of the main subject at the time of self-photography, there is no sudden change in state of exposure and video in which the state of exposure of the main subject is stable is obtained.

Second Embodiment

AF control at the time of self-photography in this embodiment is performed in a manner different from that of the prior art.

The hardware configuration is the same as that of the first embodiment but AF control performed by the microcomputer 17 is further provided with an AF control function for self-photography.

In the first embodiment, photographic conditions for self-photography are more limited than in the case of ordinary photography. In particular, distance between the image sensing apparatus and the subject is limited to about one meter in case of self-photography, whereas the distance is several centimeters to infinity in case of ordinary photography. In the second embodiment, the AF control unit performs control in conformity with the above-mentioned photographic conditions for self-photography, as well as in conformity with ordinary photographic conditions.

The operation of AF control according to this embodiment will now be described.

Figure 20:
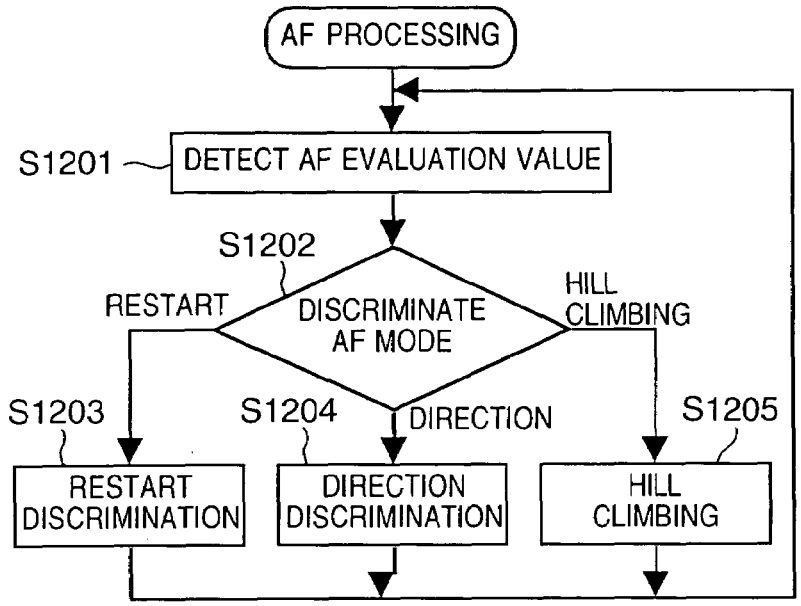
FIG. 20 is a flowchart of AF control in the image sensing apparatus according to the prior art.
Figure 21:
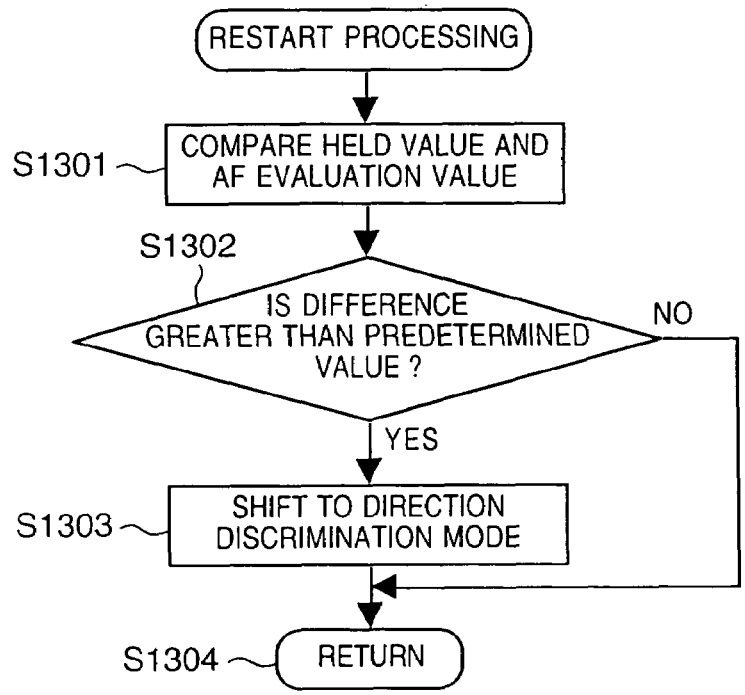
FIG. 21 is a control flowchart of AF restart processing in the image sensing apparatus according to the prior art.
Figure 22:
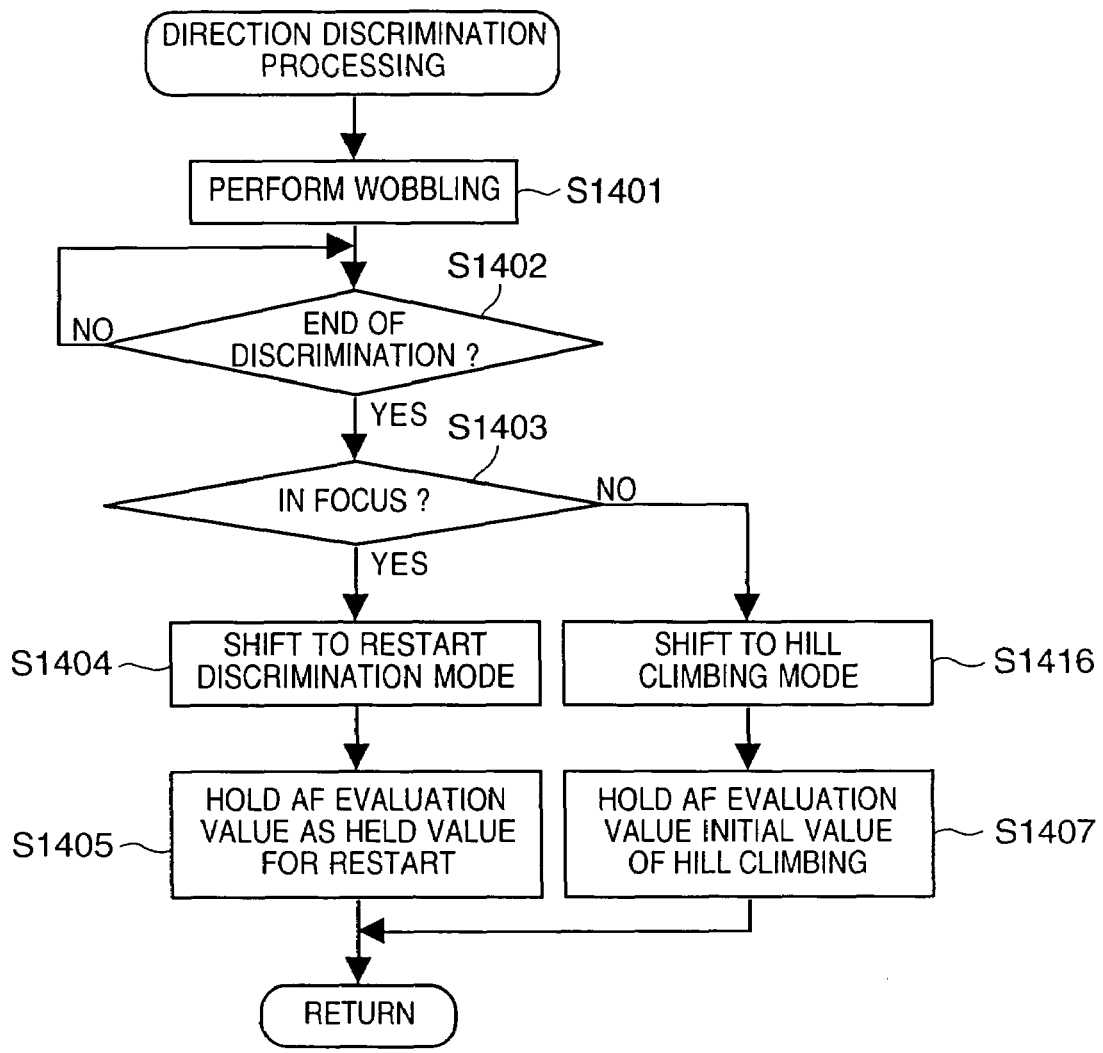
FIG. 22 is a control flowchart of direction discrimination processing in the image sensing apparatus according to the prior art.

First, an AF evaluation value is acquired from the AF value evaluation processor 16 at step S1201 in FIG. 20 in the same manner as in the prior art. The currently prevailing AF mode is discriminated at step S1202. If the prevailing mode is the restart discrimination mode or direction discrimination mode, processing similar to that of the prior art is executed. If the prevailing mode is the hill-climbing mode, then processing is executed in accordance with the control flowchart of FIG. 5, to which processing for dealing with self-photography has been added.

Figure 5:
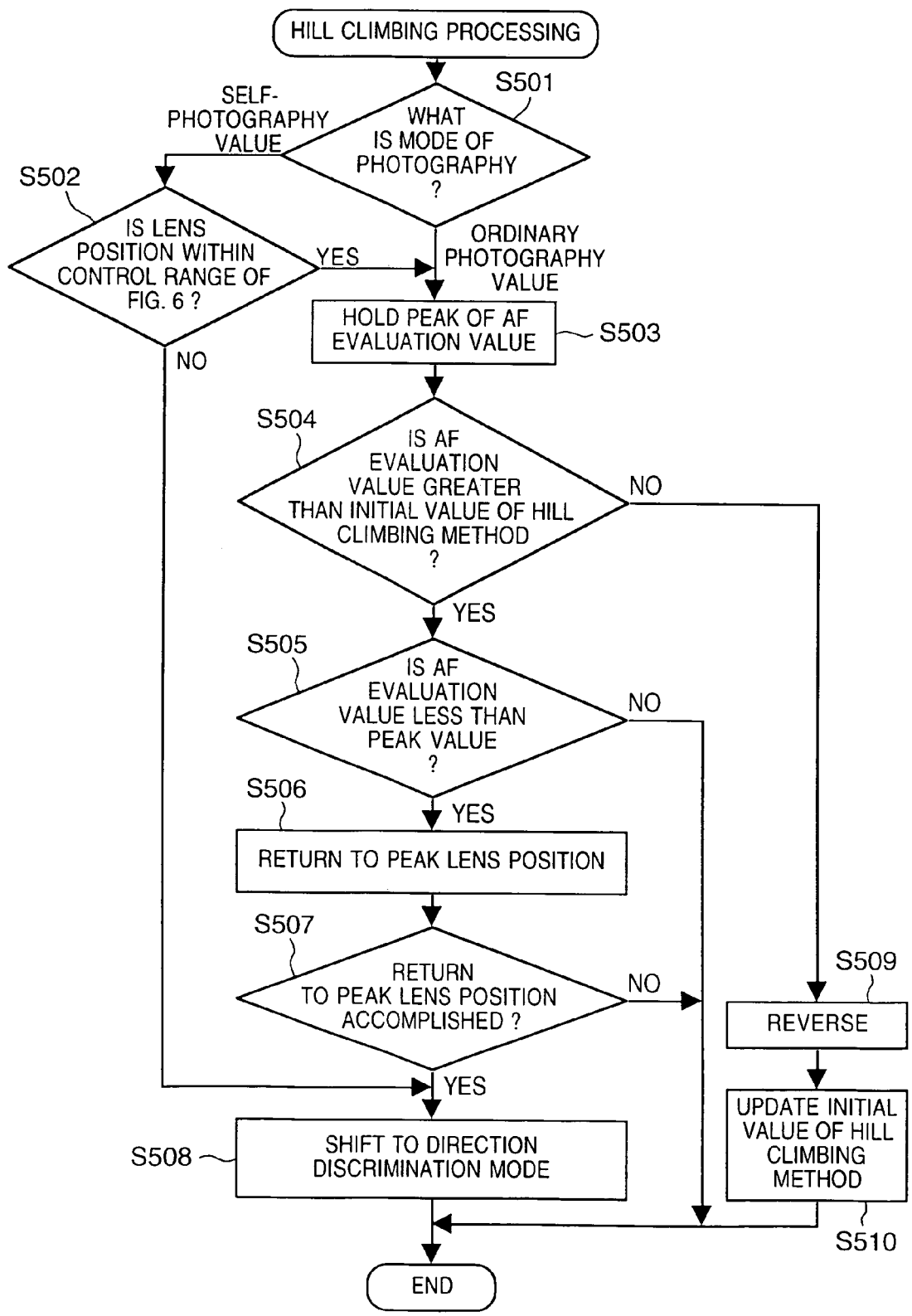
FIG. 5 is a control flowchart of hill-climbing processing in an image sensing apparatus according to a second embodiment of the present invention.

Hill-climbing processing for AF control according to this embodiment will now be described based upon the control flowchart of FIG. 5.

Figure 6:
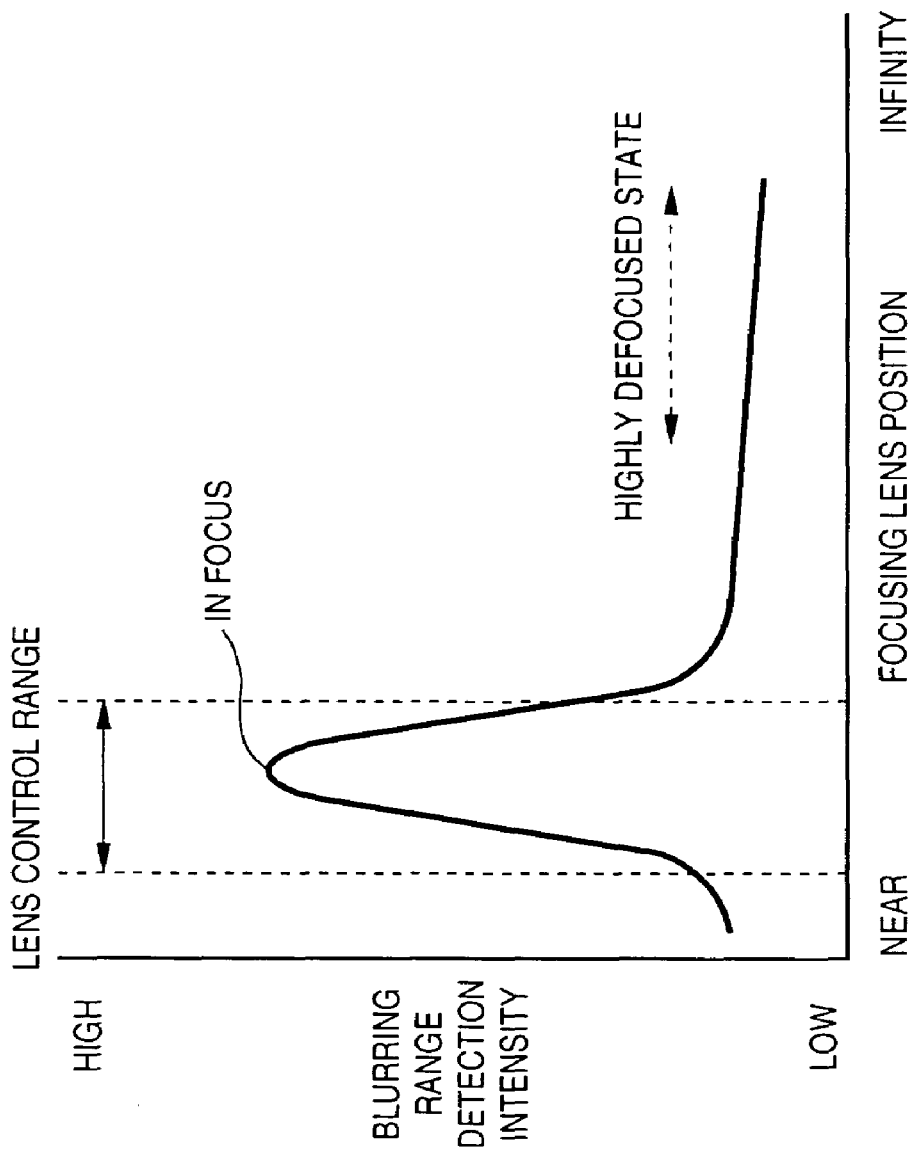
FIG. 6 is a graph useful in describing self-photography according to the second embodiment.
Figure 19:
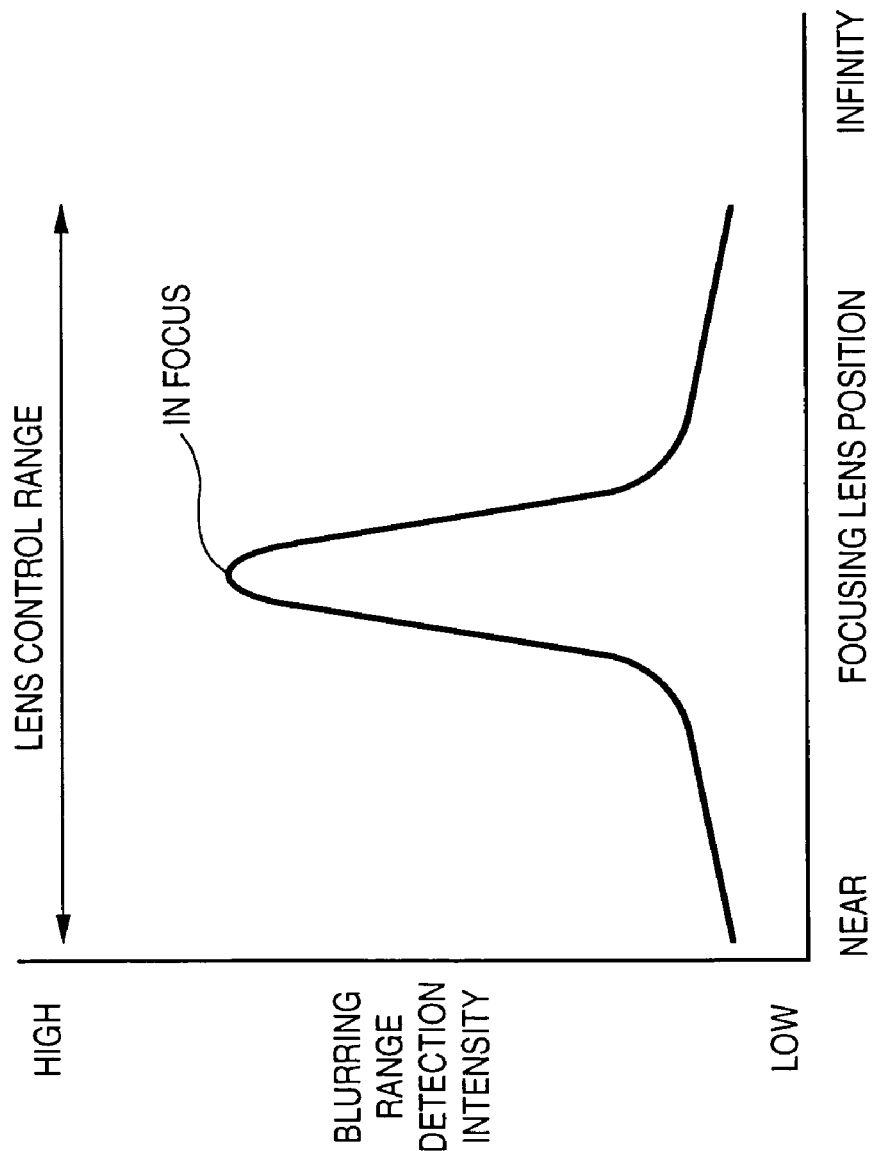
FIG. 19 is a graph useful in describing AF control in the image sensing apparatus according to the prior art.
Figure 23:
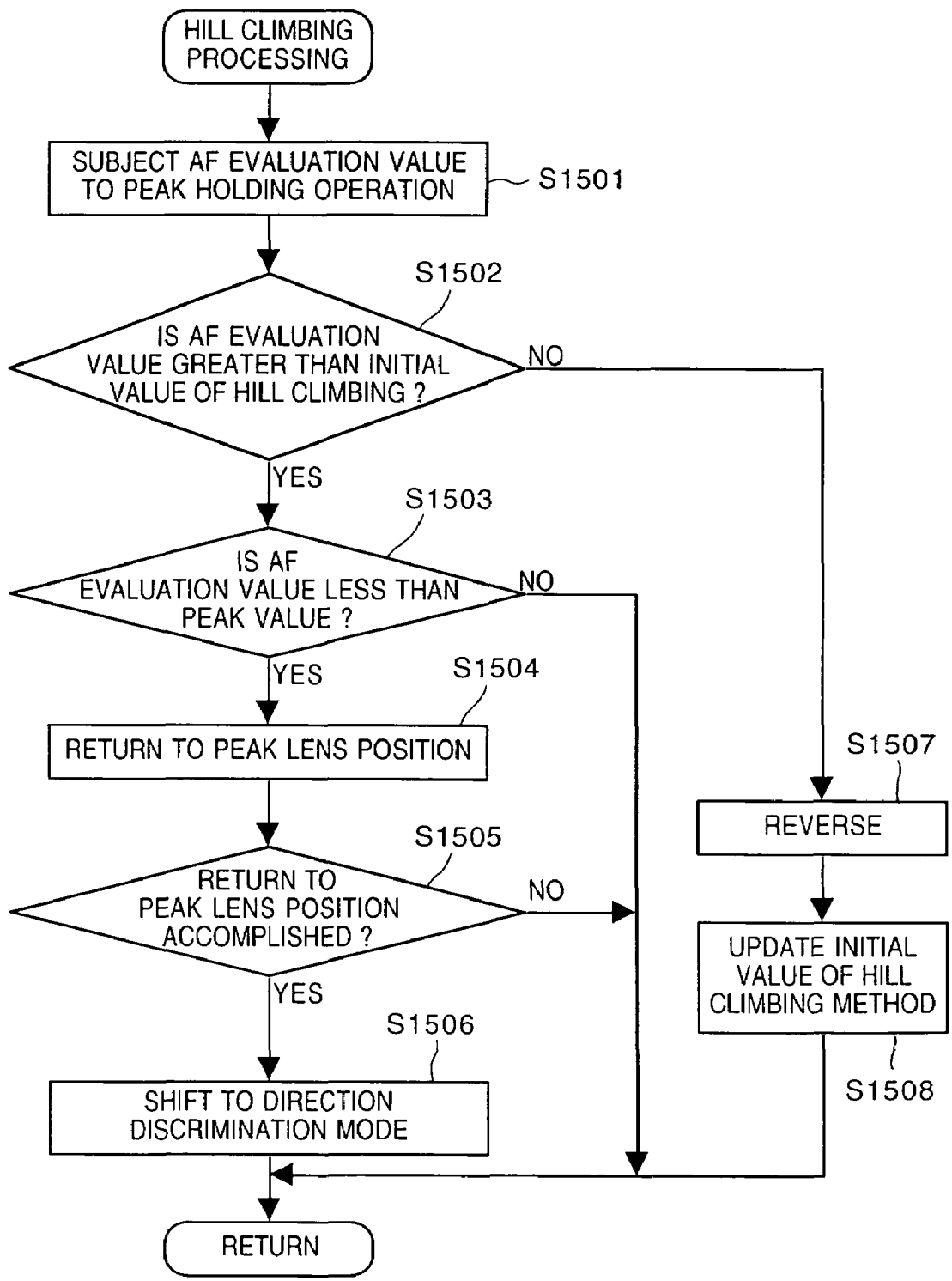
FIG. 23 is a control flowchart of hill-climbing processing in the image sensing apparatus according to the prior art.
Figure 24A:
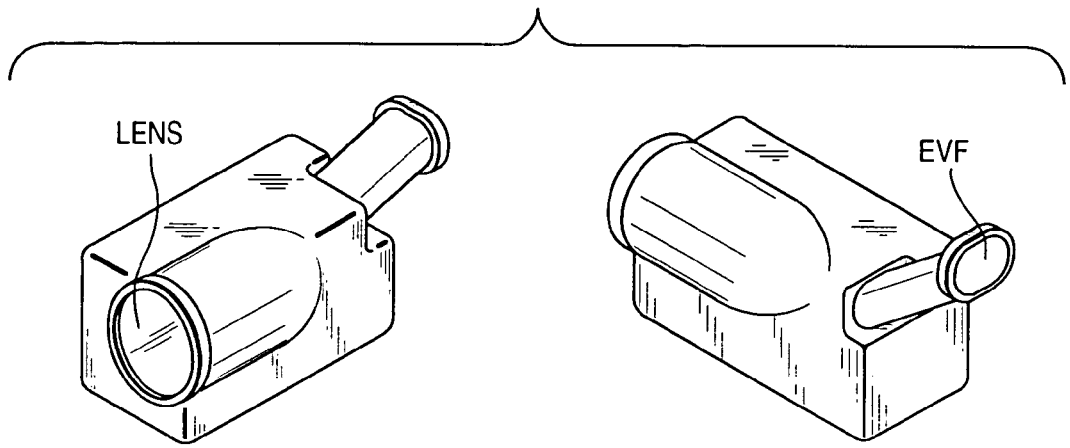
FIGS. 24A–24C are diagrams useful in describing an image sensing apparatus having an electronic viewfinder and a large-size monitor.
Figure 24B:
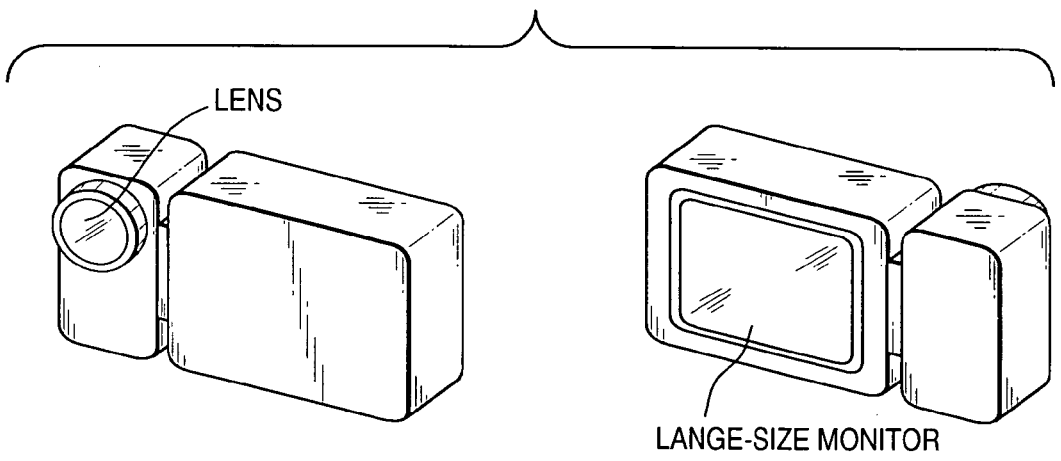
Figure 24C:
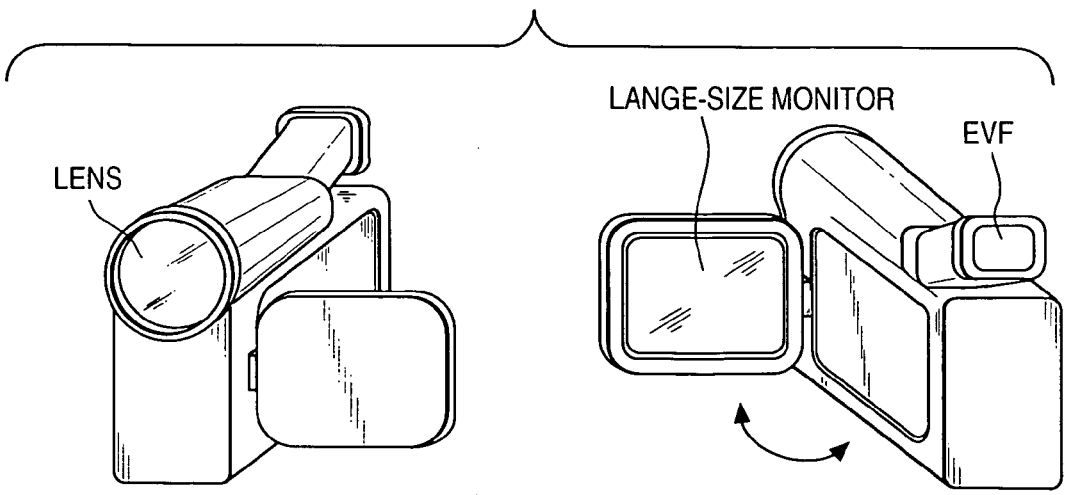

First, it is determined at step S501 whether the prevailing mode is the ordinary photography mode or the self-photography mode. In case of the ordinary photography mode, the program proceeds to step S503 and processing similar to that of the prior art is executed (see FIG. 23). In case of the self-photography mode, the program proceeds to step S502. Here the current focusing lens position is detected and it is determined whether the current focusing lens position lies inside or outside a preset lens control range. The full range from near to infinity is adopted as the controllable range in case of ordinary photography, as shown in FIG. 19. In the case of self-photography, on the other hand, the distance to the subject is more limited. Accordingly, the lens control range is limited to the close-up region of approximately one meter, as illustrated in FIG. 6. If the current focusing lens position lies within the lens control range of FIG. 6, the program proceeds to step S503, where hill-climbing control similar to that of the prior art is continued. If the current focusing lens position exceeds the lens control range, however, processing for hill-climbing control is terminated, even if the AF evaluation value is smaller than the peak value, and operation shifts to the direction discrimination mode.

Figure 15A:
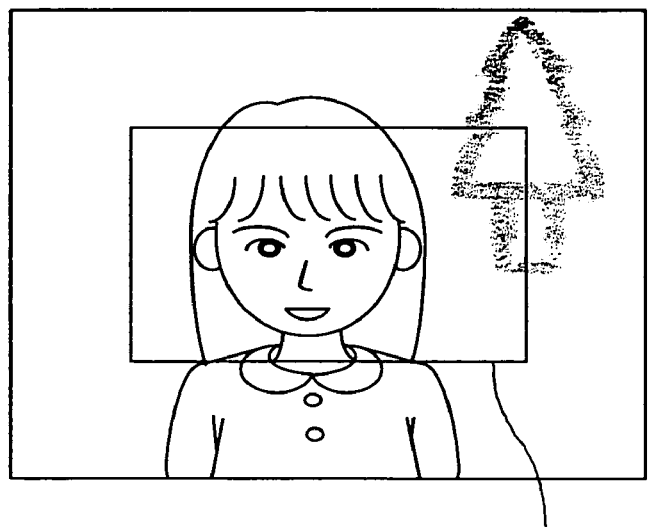
FIGS. 15A and 15B are diagrams useful in describing self-photography.
Figure 15B:
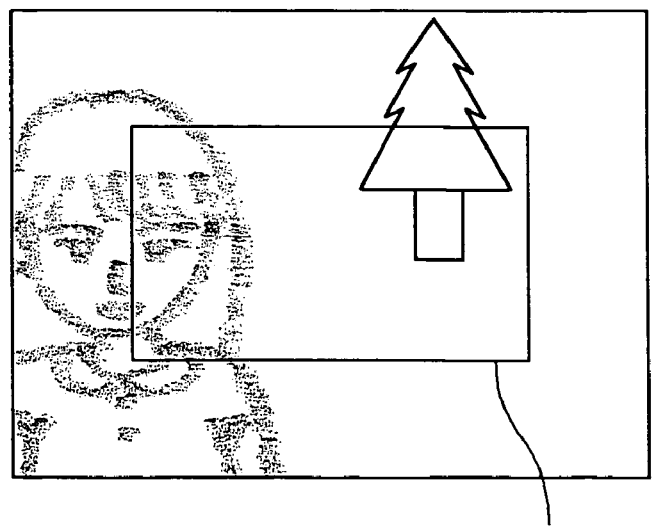

By thus achieving the focused state only at a focusing lens position in the lens control range of FIG. 6 at the time of self-photography, the focusing lens position will not be controlled up to a focusing position that results in a highly defocused state, as shown in FIG. 6, even if the main subject has shifted from the center of the screen because of hand movement of the photographer or temporary movement of the subject at the time of self-photography, as illustrated in FIG. 15B. As a consequence, the main subject will not appear greatly out of focus. In addition, since the lens control range is narrow, focusing control is performed more quickly.

More stable video can be obtained in this embodiment as well by slowing down the response of AF control.

In each of the foregoing embodiments the photographic mode changeover unit is externally provided. However, this does not impose a limitation upon the invention. An arrangement may be adopted in which the mode changes over from ordinary photography to self-photography internally when the image sensing lens has been brought to the position of self-photography. Further, the state in which the light-impinging direction of the lens and the display direction of the monitor agree is adopted as the self-photography state. However, since the monitor can be viewed obliquely as well, the self-photography state covers a situation in which the two directions are not in perfect agreement but in substantial agreement to a degree that makes self-photography possible.

Thus, in accordance with the embodiments set forth above, optimum video can be obtained not only for ordinary photography but for self-photography as well.

Though the first and second embodiments have been described independently, an image sensing apparatus having the functions of both the first and second embodiments would provide the same effects. Further, by combining the functions of the third embodiment (described below) in various ways with those of the first and second embodiments, an image sensing apparatus capable of performing self-photography in more ideal fashion can be obtained.

Third Embodiment

The third embodiment is adapted to avoid the following difficulty: In self-photography, the photographer points the image sensing apparatus at himself or herself to perform photography while supporting the apparatus by his or her own arms. Consequently, if photography is performed in a state in which the zoom lens has been set to the telephoto side, only a part of the photographer's body will be captured. To prevent this, the photographer must manipulate a zoom lever to move the zoom lens to the wide-angle side before photography can be carried out.

Figure 7:
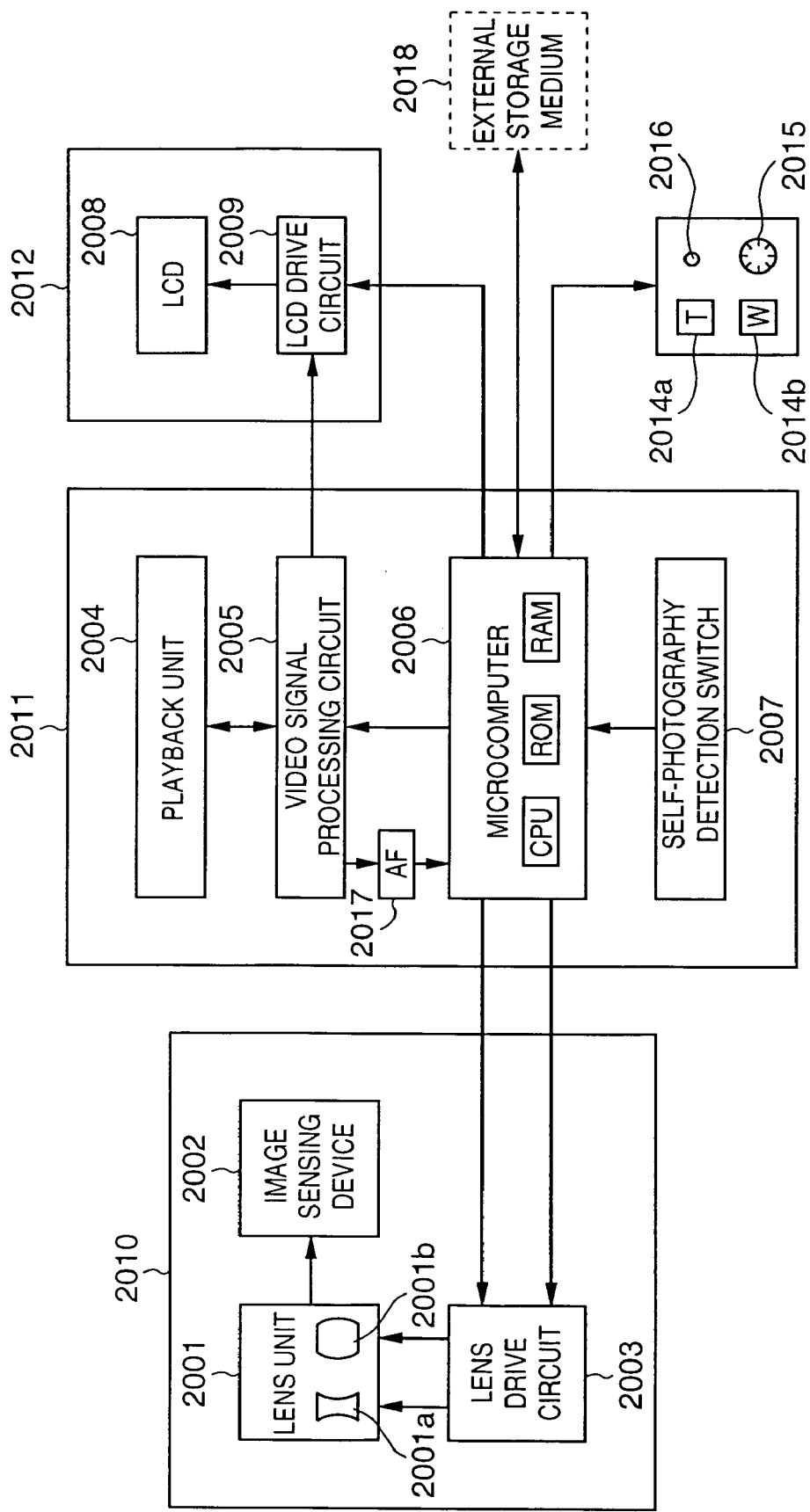
FIG. 7 is a block diagram illustrating the construction of an image sensing apparatus according to a third embodiment of the present invention.

FIG. 7 is a block diagram showing the construction of the image sensing apparatus according to this embodiment. Though the basic construction of this embodiment resembles that of the first and second embodiments, AE control is omitted in this embodiment in order to avoid complexity.

As shown in FIG. 7, a camera unit 2010 has a lens unit 2001 equipped with a zoom lens 2001a for adjusting magnification of the sensed image and a focusing lens 2001b for adjusting focal point, an image sensing device 2002 for converting the optical image, which has been obtained via the lens unit 2001, to the image of the subject, and a lens drive circuit 2003.

The lens drive circuit 2003 drives the zoom lens 2001a and the focusing lens 2001b by a command from a microcomputer 2006 (described later) that includes a CPU, a ROM and a RAM.

A recorder unit 2011 includes a video signal processing circuit 2005 for converting the signal obtained by the image sensing device 2002 to a standardized video signal such as an NTSC signal. In a case where the microcomputer 2006 gives notification of the fact that self-photography is being performed, the video signal processing circuit 2005 executes processing to turn the output image upside down. The recorder unit 2011 further includes a self-photography detection switch 2007 for sensing whether the display of an LCD 2008 is pointing toward the subject.

The recorder unit 2011 further includes a playback unit 2004 that stores the video signal output by the video signal processing circuit 2005 on a recording medium such as magnetic tape. The microcomputer 2006, which is constituted by the aforementioned CPU and memories, controls the overall image sensing apparatus. Further, the microcomputer 2006 functions as control means which, in dependence upon the output signal from the self-photography detection switch 2007, controls the zoom lens and focusing lens to a prescribed wide-angle position or close-up position.

An AF circuit 2017 extracts from the video signal a signal component, such as a high-frequency component, that varies depending upon the focusing state of the lens, thereby detected the state of focusing. A focus signal that has been detected by the AF circuit 2017 is supplied to the microcomputer 2006. The latter calculates a focusing lens control value and supplies the value to the lens drive circuit 2003, whereby focusing is executed.

A display unit 2012 includes an LCD 2008 for displaying an image currently being captured or an image reproduced by the playback unit 2004. An LCD drive circuit 2009 outputs an image to the LCD 2008 based upon the video signal output by the video signal processing circuit 2005.

Zoom switches 2014a, 2014b control the magnification of the sensed image by the zoom lens 2001a in the telephoto and wide-angle directions, respectively. A dial 2015 sets the subject distance of the focusing lens 2001b to a prescribed close-up side (the close-up limit or a point near this limit) controlled over a range of about 10 cm to 1 m at the time of self-photography. If the dial 2015 is turned clockwise, the setting can be changed gradually to longer distances. Turning the dial 2015 counter-clockwise allows the setting to be changed gradually to the close-up position.

A setting switch 2016 is a button that sets the sensed-image magnification and subject distance obtained as a result of the operator manipulating the zoom switches 2014a, 20145 and dial 2015. When the setting switch 2016 is turned ON (pressed), the current sensed-image magnification and subject distance resulting from the operation performed by the operator are stored in the RAM provided in the microcomputer 2006.

In self-photography, it is believed adequate to set the magnification of the sensed image to the wide-angle limit or to a point near this limit, and to set the subject distance to a point on the close-up side, i.e., to 10 cm–1 m.

In this embodiment, the dial 2015 and the setting switch 2016 are also referred to collectively as a subject distance setting unit, and the zoom switches 2014a, 2014b is also referred to collectively as a sensed-image magnification setting unit.

Figure 8:
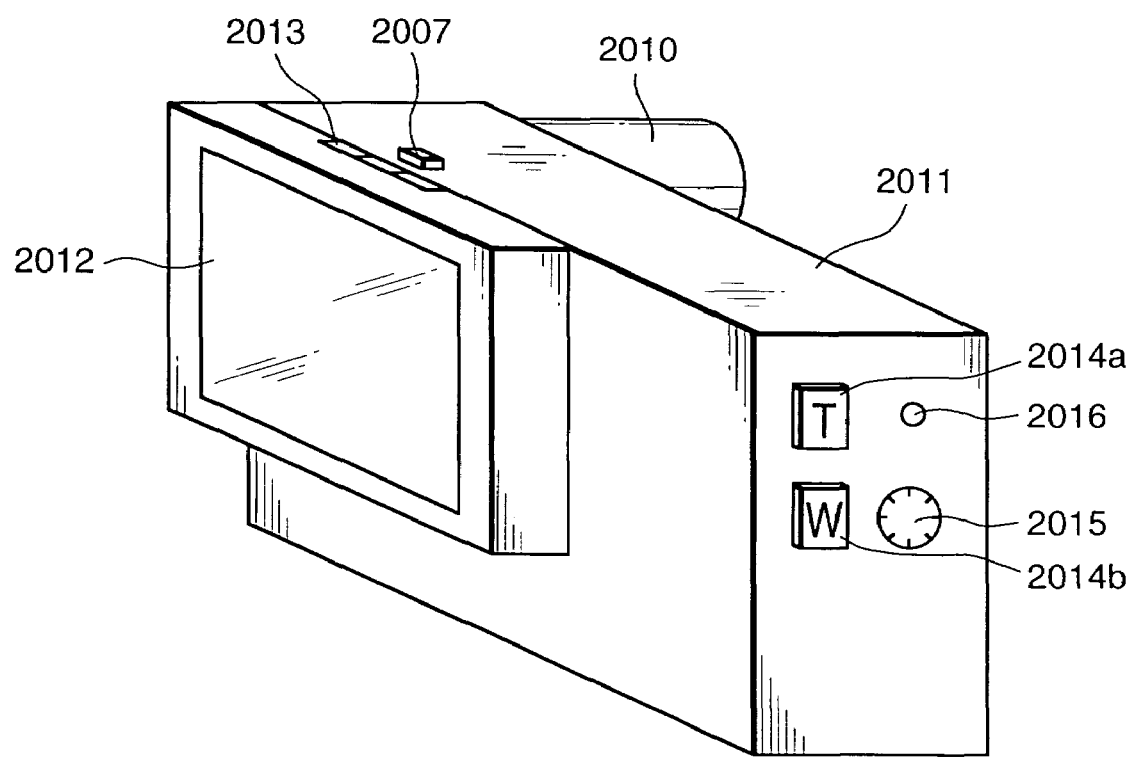
FIG. 8 is a perspective view illustrating the image sensing apparatus according to the third embodiment.
Figure 9A:
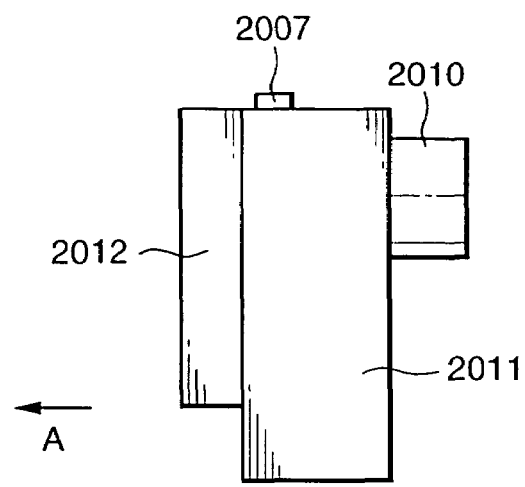
FIG. 9A is a side view of the image sensing apparatus when it is used for ordinary photography.
Figure 9B:
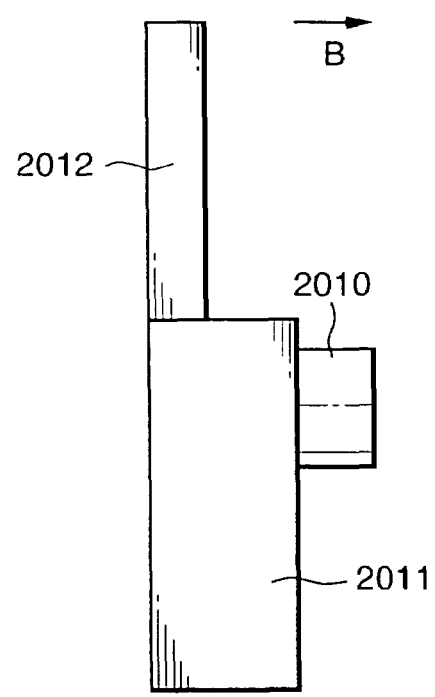
FIG. 9B is a side view of the image sensing apparatus when it is used for self-photography.

FIG. 8 is a perspective view of the image sensing apparatus according to this embodiment, FIG. 9A is a side view of the apparatus when it is used for ordinary photography, and FIG. 9B is a side view of the apparatus when it is used for self-photography.

A hinge 2013 in FIG. 8 connects the recorder unit 2011 (the main body of the image sensing apparatus) and the display unit 2012 together. The display unit 2012 is capable of being turned to face the subject (i.e., in the direction in which the image is sensed). In FIG. 9A the display screen of the display unit 2012 is facing in the direction (arrow A) opposite that in which the image is sensed. In FIG. 9B, on the other hand, the display screen of the display unit 2012 is facing in the same direction (arrow B) as that in which the image is sensed. This makes it possible for the photographer to become the subject and verify his or her image during photography. The self-photography detection switch 2007 is pressed for self-photography, whereby a command indicative of the self-photography mode is sent to the microcomputer 2006 (FIG. 7).

The operation of the image sensing apparatus in a case where self-photography is performed according to this embodiment will now be described in accordance with the control flowchart of FIG. 10. As in the first and second embodiments, a program corresponding to the control flowchart for this operation is stored in the ROM or RAM and executed by the CPU, though the program may be executed upon being loaded into the RAM from an external storage medium 2017.

If the image sensing apparatus is in the state shown in FIG. 9B and the display screen of the display unit 2012 is facing the subject, the self-photography detection switch 2007 turns ON at step S2101 in FIG. 10 and the microcomputer 2006 is notified of the fact that self-photography is capable of being executed.

Upon being notified of the fact that the self-photography detection switch 2007 is ON, the microcomputer 2006 saves the last zoom magnification and subject distance that prevailed at the time of ordinary photography in the RAM at step S2101a and, at step S2102, instructs the video signal processing circuit 2005 to execute processing for turning the image upside down. In response, the video signal processing circuit 2005 converts the signal obtained by the image sensing device 2002 to a standardized signal such as an NTSC signal and outputs the signal to the playback unit 2004. The signal representing the image obtained by the processing for turning the image upside down is output to the LCD drive circuit 2009.

Next, at step S2103, the sensed-image magnification and the subject distance for self-photography, which have been set beforehand by the setting switch 2016, etc. and stored in the RAM of the microcomputer 2006, are read out of the RAM by the microcomputer 2006 which, on the basis thereof, instructs the lens drive circuit 2003 to drive the lens unit 2001. The lens drive circuit 2003 responds to the instruction by controlling the magnification of the zoom lens 2001a to the wide-angle limit or to point near this limit, and by controlling the focal-point position of the focusing lens 2001b to the close-up limit or to a point near this limit.

Following the completion of the processing at step S2103, the microcomputer 2006 executes AF control at step S2104 by sensing the peak of the high-frequency component of the video signal from the video signal processing circuit 2005.

Thus, by sensing that the display on the LCD 2008 is facing in a direction the same as the image sensing direction and that self-photography is possible in the manner described above, the magnification of the sensed image is set to the vicinity of the wide-angle limit and the focal-point position is controlled to the close-up side based upon the information that has been set in advance, thereby making possible self-photography in which an appropriate image is obtained.

Though the zoom lens 2001a and focusing lens 2001b are driven for self-photography in the flowchart of FIG. 10, it will suffice if either one of these lenses is driven.

Figure 11:
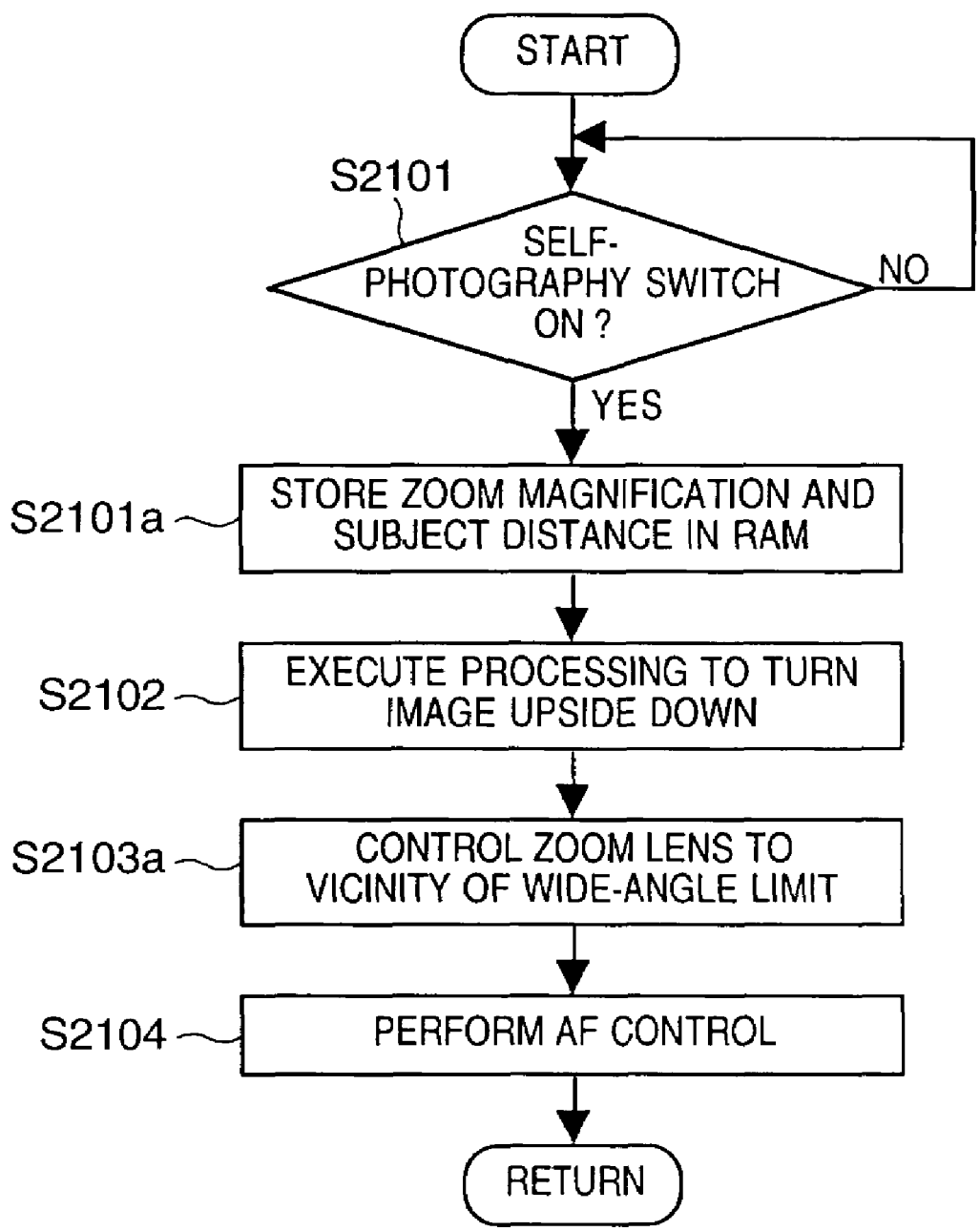
FIG. 11 is flowchart of another example of processing executed when the image sensing apparatus of the third embodiment is used for self-photography.

FIG. 11 is a flowchart of processing executed when only the zoom lens 2001a is driven. When the self-photography detection switch 2007 is found to be ON, the zoom lens 2001a is controlled to the vicinity of the wide-angle limit at step S2103a. Other aspects of the construction and operation of the image sensing apparatus are as set forth in the above-described embodiment and need not be described again.

Figure 12:
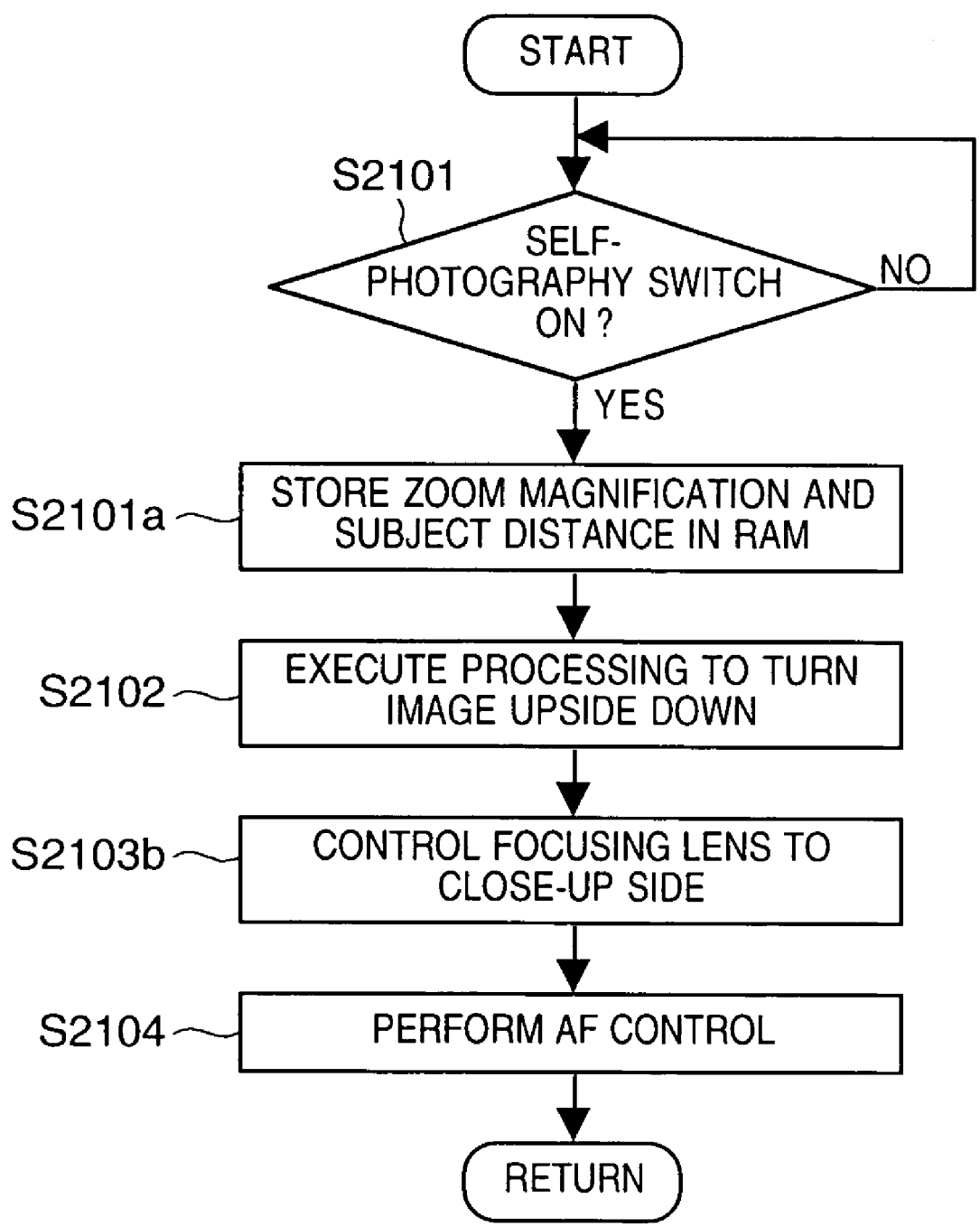
FIG. 12 is flowchart of another example of processing executed when the image sensing apparatus of the third embodiment is used for self-photography.

FIG. 12 is a flowchart of processing executed when only the focusing lens 2001b is driven. When the self-photography detection switch 2007 is found to be ON, the focusing lens 2001b is controlled so as to focus on the close-up side at step S2103b. Other aspects of the construction and operation of the image sensing apparatus are as set forth in the above-described embodiment and need not be described again.

FIG. 14 is a flowchart of processing showing the operation of the image sensing apparatus when the image sensing apparatus is restored from the self-photography state to the ordinary photography state.

If the microcomputer 2006 finds that the self-photography detection switch 2007 is OFF and, hence, that the image sensing apparatus is in the state for ordinary photography at step S2201, the microcomputer 2006 instructs the video signal processing circuit 2005 to halt the processing (step S2202) that turns the image obtained from the image sensing device 2002 upside down before outputting it to the LCD drive circuit 2009. Instead, the microcomputer 2006 executes ordinary read-out processing.

This is followed by step S2203, at which the microcomputer 2006 calls information concerning lens parameters that relate to the sensed-image magnification and distance from the focusing lens to the subject that prevailed just before the self-photography detection switch 2007 turned ON, these parameters having been stored in the RAM at step S2101a.

Next, at step S2204, and on the basis of the information that has been called, the playback unit 2004 outputs a command to the lens drive circuit 2003 so as to drive the zoom lens 2001a and the focusing lens 2001b, thereby driving the lens 2001a and the focusing lens 2001b.

By executing processing in this fashion, it is possible to restore the magnification of the sensed image and the focal-point position that prevailed prior to execution of self-photography, thereby making possible smooth photography from self-photography to ordinary photography.

In a case where the photographer performs self-photography, it is necessary for the attitude of the main body of the image sensing apparatus to be changed from that of the ordinary photography state. When the display screen of the display unit 2012 is moved to face in the image sensing direction, the shooting of video usually is halted temporarily. Further, if the display unit 2012 is moved during shooting, the lens unit 2001 is driven into motion, thereby causing the shooting of unexpectedly poor video. To prevent this, it will suffice for the microcomputer to execute processing that inhibits control of the lens unit even if the self-photography detection switch 2007 is turned ON during shooting (during the recording of the sensed image by the playback unit 2004).

Figure 13:
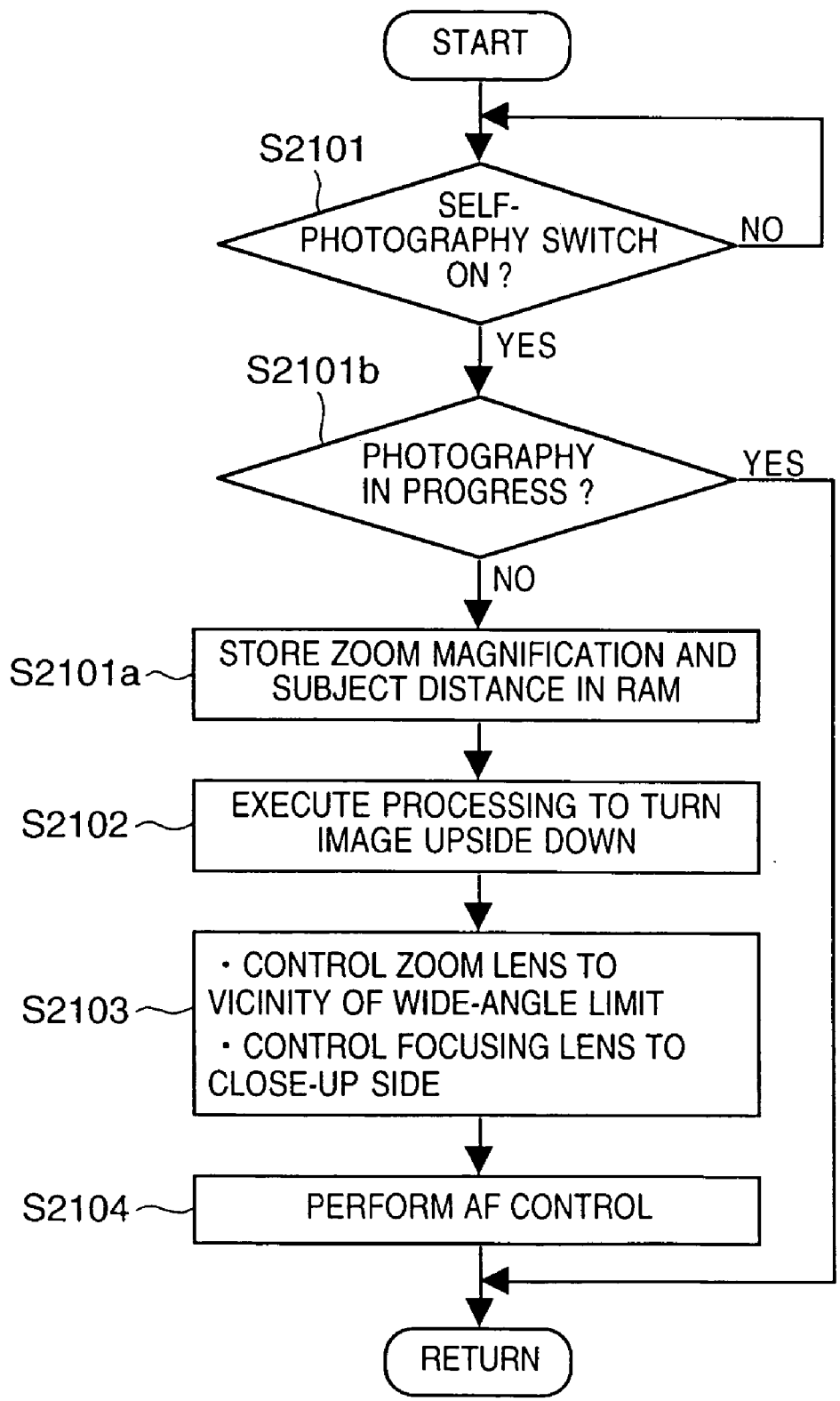
FIG. 13 is flowchart of another example of processing executed when the image sensing apparatus of the third embodiment is used for self-photography.

FIG. 13 is a flowchart of processing for inhibiting zoom control in the image sensing apparatus in a case where it is sensed that the self-photography detection switch 2007 is ON during shooting.

When the self-photography detection switch 2007 is found to be ON at step S2101 in the flowchart of FIG. 13, it is determined at step S2101b whether the image sensing apparatus is currently recording a sensed image by means of the playback unit 2004. If recording is not in progress, processing from step S2101a onward is executed in the manner described above. If recording of an image is in progress, then control applied to the lens unit 2001 is inhibited. The control inhibiting means in this case corresponds to the microcomputer 2006.

If the above-described processing is executed, zoom control of the lens unit when self-photography is in effect will not be executed while the shooting of video is in progress.

Thus, in accordance with this embodiment as described above, the zoom lens is controlled to the vicinity of the wide-angle limit and the focusing lens is controlled to focus on the close-up side of the image sensing apparatus in a case where the LCD display screen is pointed in a direction the same as the image sensing direction at the time of self-photography. This makes it possible to execute appropriate shooting of video promptly at the time of self-photography.

The present invention can be applied to a system constituted by a plurality of devices or to an apparatus comprising a single device.

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

In a case where the present invention is applied to the above-described storage medium, the program codes for executing the processing that corresponds to the flowcharts described earlier would be stored on the recording medium.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus having a monitor in which direction of a display can be changed relative to a direction in which light from the subject impinges upon a lens, and a photography assist means for adjusting photographic conditions automatically, said photography assist means having an automatic exposure control means which, wherein at the time of self-photography, in which the direction in which light impinges upon the lens and the display direction of the monitor agree, said automatic exposure control means performs control by a photometry method different from that at the time of other photography.

2. The apparatus according to claim 1, wherein at the time of self-photography, said automatic exposure control means further makes response slower than that at the time of photography.

3. An image sensing apparatus having a lens for forming an image of a subject, a monitor in which direction of a display can be changed relative to a direction in which light from the subject impinges upon the lens, and a photography assist mechanism for adjusting photographic conditions automatically, said photography assist mechanism having an automatic focus control means which, wherein at the time of self-photography, in which the direction in which light impinges upon the lens and the display direction of the monitor agree, said automatic focus control means performs control though a sequence different from that at the time of other ordinary photography.

4. The apparatus according to claim 3, wherein at the time of self-photography, said automatic focus control means further makes response slower than that at the time of ordinary photography.

5. An image sensing apparatus having an image sensing device for sensing the image of a subject whose image is sensed by the image sensing device, said apparatus comprising:

display means capable of displaying the image sensed by the image sensing device;

moving means for moving display direction of said display means to a direction on the side of the subject;

sensing means for sensing that the display direction of an image on said display means is being moved to the side of the subject by said moving means;

control means which, if said sensing means has sensed that the display direction of the image on said display means is being moved to the side of the subject, at first and regardless of status of the subject, controls the sensed-image magnification of a zoom lens to a wide-angle magnification and controls distance to the subject, which is controlled by a focusing lens, to a short distance in front of the image sensing apparatus; and memory means for storing the sensed-image magnification as well as the subject distance, when said sensing means has sensed that the display direction of the image on said display means is being moved to the side of the subject, wherein when said sensing means no longer senses that the display direction of the image on said display means is being moved to the side of the subject, said control means controls the zoom lens to the sensed-image magnification that has been stored by said memory means and controls the focusing lens to the subject distance that has been stored by said memory means.

6. The apparatus according to claim 5, wherein said control means controls the sensed-image magnification of the zoom lens to a wide-angle limit or to a point near the wide-angle limit, and controls distance to the subject, which is controlled by the focusing lens, to a short-distance limit in front of the image sensing apparatus or to a point near the short-distance limit.

7. The apparatus according to claim 5, further comprising: magnification setting means for setting said sensed-image magnification controlled by said control means; and subject-distance setting means for setting a subject distance at which the focusing lens, which is controlled by said control means, is brought into focus.

8. An image sensing apparatus having an image sensing device for sensing the image of a subject whose image is sensed by the image sensing device, said apparatus comprising:

display means capable of displaying the image sensed by the image sensing device;

moving means for moving display direction of said display means to a direction on the side of the subject;

sensing means for sensing that the display direction of an image on said display means is being moved to the side of the subject by said moving means;

control means which, if said sensing means has sensed that the display direction of the image on said display means is being moved to the side of the subject, at first and regardless of status of the subject, controls the sensed-image magnification of a zoom lens to a wide-angle magnification and controls distance to the subject, which is controlled by a focusing lens, to a short distance in front of the image sensing apparatus; and recording means for recording an image based upon an image signal indicative of an image sensed by said image sensing device, and control inhibiting means for inhibiting control by said control means if the image is being recorded by said recording means.

9. An image sensing apparatus having an image sensing device for sensing the image of a subject, said apparatus comprising:

display means capable of displaying the image sensed by said image sensing device;

moving means for moving display direction of said display means to a direction on the side of the subject;

sensing means for sensing that the display direction of the image on said display means is being moved to the side of the subject by said moving means;

memory means for storing the sensed image magnification controlled by a zoom lens when said sensing means has sensed that the display direction of the image on said display means is being moved to the side of the subject; and control means which, if said sensing means has sensed that the display direction of the image on said display means is being moved to the side of the subject, controls the image magnification of the zoom lens to a wide-angle magnification, and when said sensing means no longer senses that the display direction of the image on said display means is being moved to the side of the subject, controls the zoom lens to the sensed-image magnification that has been stored by said memory means.

10. The apparatus according to claim 9, wherein said control means controls the sensed-image magnification of the zoom lens to the wide-angle limit or to a point near the wide-angle limit.

11. The apparatus according to claim 9, further comprising magnification setting means for setting the sensed-image magnification controlled by said control means.

12. An image sensing apparatus having an image sensing device for sensing the image of a subject, whose image is sensed by the image sensing device, said apparatus comprising:

display means capable of displaying the image sensed by said image sensing device;

moving means for moving display direction of the display means to a direction on the side of the subject;

sensing means for sensing that the display direction of the image on said display means is being moved to the side of the subject by said moving means;

memory means for storing the subject distance controlled by a focusing lens when said sensing means has sensed that the display direction of the image on said display means is being moved to the side of the subject; and control means which, if said sensing means has sensed that the display direction of the image on said display means is being moved to the side of the subject, controls distance to the subject, which is controlled by the focusing lens, to a short distance in front of the image sensing apparatus, and when said sensing means no longer senses that the display direction of the image on said display means is being moved to the side of the subject, said control means controls the focusing lens to the subject distance that has been stored by said memory means.

13. The apparatus according to claim 12, wherein said control means controls distance to the subject, which is controlled by the focusing lens, to a short-distance limit in front of the image sensing apparatus or to a point near the short-distance limit.

14. The apparatus according to claim 12, further comprising subject-distance setting means for setting a subject distance controlled by the focusing lens, which is controlled by said control means.

15. The apparatus according to claim 5, further comprising automatic focusing means for executing automatic focusing after the focusing lens has been controlled by said control means.

16. The apparatus according to claim 12, further comprising automatic focusing means for executing automatic focusing after the focusing lens has been controlled by said control means.

17. The apparatus according to claim 7, wherein said subject-distance setting means is capable of setting a subject distance within a range of 10 cm to 1 m.

18. The apparatus according to claim 14, wherein said subject-distance setting means is capable of setting a subject distance within a range of 10 cm to 1 m.

19. An image sensing apparatus having an image sensing device for sensing the image of a subject, said apparatus comprising:

display means capable of displaying the image sensed by said image sensing device;

moving means for moving display direction of said display means to a direction on the side of the subject;

sensing means for sensing that the display direction of the image on said display means is being moved to the side of the subject by said moving means;

memory means for storing the sensed-image magnification controlled by a zoom lens, as well as the subject distance controlled by a focusing lens, when said sensing means has sensed that the display direction of the image on said display means is being moved to the side of the subject; and control means for controlling the zoom lens to the sensed-image magnification that has been stored by said memory means and the focusing lens to the subject distance that has been stored by said memory means when said sensing means no longer senses that the display direction of the image on said display means is being moved to the side of the subject.

20. An image sensing apparatus having an image sensing device for sensing the image of a subject, and a focusing lens for deciding focal point position of the subject whose image is sensed by the image device, said apparatus comprising:

display means capable of displaying the image sensed by said image sensing device;

moving means for moving display direction of said display means to a direction on the side of the subject sensing means for sensing that the display direction of the image on said display means is being moved to the side of the subject by said moving means;

memory means for storing the subject distance controlled by the focusing lens when said sensing means has sensed that the display direction of the image on said display means is being moved to the side of the subject; and control means for controlling the focusing lens to the subject distance that has been stored by said memory means when the sensing means no longer senses that the display direction of the image on said display means is being moved to the side of the subject.

21. A method of performing photography with an image sensing apparatus by which a photographer can be perform self-photography, wherein in a case where said image sensing apparatus has at least one of an automatic exposure function, automatic focusing function and zoom function, comprising the steps of:

setting parameters different from those at the time of ordinary photography when it is sensed that the photographer is performing self-photography;

saving sensed-image magnification and distance to a subject that prevailed at the time of ordinary photography if self-photography is sensed; and restoring the saved sensed-image magnification and distance to the subject when ordinary photography is restored.

22. The method according to claim 21, wherein in a case where said image sensing apparatus has the automatic exposure function or the automatic focusing function, a photometry area is narrowed to a central portion more at the time of self-photography than at the time of ordinary photography.

23. The method according to claim 21, wherein in a case where said image sensing apparatus has the zoom function, magnification of a sensed image is initially set to the vicinity of a wide-angle limit and distance to a subject is initially set to a short distance in front of the image sensing apparatus.

24. A storage medium for storing, in computer readable fashion, a control program for controlling an image sensing apparatus by which a photographer can perform self-photography, said control program including at least the steps of:
    setting parameters, which are used in an automatic exposure function, automatic focusing function and zoom function, to parameters different from those at the time of ordinary photography when it is sensed that the photographer is performing self-photography;
    saving sensed-image magnification and distance to a subject that prevailed at the time of ordinary photography if self-photography is sensed; and
    restoring the saved sensed-image magnification and distance to the subject when ordinary photography is restored.

25. An image sensing apparatus having a lens for forming an image of a subject a monitor in which direction of a display can be changed relative to a direction in which light from the subject impinges upon the lens, and a photography assist mechanism for adjusting photographic conditions automatically, said photography assist mechanism having an automatic exposure control unit,
    wherein at the time of self-photography, in which the direction in which light impinges upon the lens and the display direction of the monitor agree, said automatic exposure control unit performs control by a photometry method different from that at the time of other ordinary photography.

26. An image sensing apparatus having a lens for forming an image of a subject, a monitor in which direction of a display can be changed relative to a direction in which light from the subject impinges upon the lens, and a photography assist mechanism for adjusting photographic conditions automatically, said photography assist mechanism having an automatic focus control unit,
    wherein at the time of self-photography, in which the direction in which light impinges upon the lens and the display direction of the monitor agree, said automatic focus control unit performs control through a sequence different from that at the time of other ordinary photography.

27. An image sensing apparatus having an image sensing device for sensing the image of a subject whose image is sensed by the image sensing device, said apparatus comprising:
    display unit which displays the image sensed by the image sensing device;
    moving unit which moves display direction of said display unit to a direction on the side of the subject;
    sensing unit which senses that the display direction of an image on said display unit is being moved to the side of the subject by said moving unit; control unit which, if said sensing unit has sensed that the display direction of the image on said display unit is being moved to the side of the subject, at first and regardless of status of the subject, controls the sensed-image magnification of a zoom lens to a wide-angle magnification and controls distance to the subject, which is controlled by a focusing lens, to a short distance in front of the image sensing apparatus; and
    memory unit for storing the sensed-image magnification as well as the subject distance, when said sensing unit has sensed that the display direction of the image on said display unit is being moved to the side of the subject,
    wherein when said sensing unit no longer senses that the display direction of the image on said display unit is being moved to the side of the subject, said control unit control the zoom lens to the sensed-image magnification that has been stored by said memory unit and controls the focusing lens to the subject distance that has been stored by said memory unit.

28. An image sensing apparatus having an image sensing device for sensing the image of a subject, said apparatus comprising:
    display unit which is capable of displaying the image sensed by said image sensing device;
    moving unit which moves the display direction of said display unit to a direction on the side of the subject;
    sensing unit which senses that the display direction of the image on said display unit is being moved to the side of the subject by said moving unit;
    memory unit which stores the sensed-image magnification controlled by a zoom lens when said sensing unit has sensed that the display direction of the image on said display unit is being moved to the side of the subject; and
    control unit which, if said sensing It has sensed that the display direction of the image on said display unit is being moved to the side of the subject, controls the image magnification of the zoom lens to a wide-angle magnifications and when said sensing unit no longer senses that the display direction of the image on said display unit is being moved to the side of the subject, controls the zoom lens to the sensed-image magnification that has been stored by said memory unit.

29. An image sensing apparatus having an image sensing device for sensing the image of a subject whose image is sensed by the image sensing device, said apparatus comprising:
    display unit which is capable of displaying the image sensed by said image sensing device;
    moving unit which moves display direction of the display unit to a direction on the side of the subject;
    sensing unit which senses that the display direction of the image on said display unit is being moved to the side of the subject by said moving unit;
    memory unit which stores the subject distance controlled by a focusing lens when said sensing unit has sensed that the display direction of the image on said display unit is being moved to the side of the subject; and
    control unit which, if said sensing unit has sensed that the display direction of the image on said display unit is being moved to the side of the subject, controls distance to the subject, which is controlled by the focusing lens, to a short distance in front of the image sensing apparatus, and when said sensing unit no longer senses that the display direction of the image on said display unit is being moved to the side of the subject, controls the focusing lens to the subject distance that has been stored by said memory unit.

30. The apparatus according to claim 27, further comprising an automatic focusing unit which executes automatic focusing after the focusing lens has been controlled by said control unit.

31. An image sensing apparatus having an image sensing device for sensing the image of a subject, said apparatus comprising:

> display unit which is capable of displaying the image sensed by said image sensing device;
>
> moving unit which moves the display direction of said display unit to a direction on the side of the subject;
>
> sensing unit which senses that the display direction of the image on said display unit is being moved to the side of the subject by said moving unit;
>
> memory unit which stores the sensed-image magnification controlled by a zoom lens, as well as the subject distance controlled by a focusing lens, when said unit has sensed that the display direction of the image on said display unit is being moved to the side of the subject; and
>
> control unit which controls the zoom lens to the sensed-image magnification that bas been stored by said memory unit and the focusing lens to the subject distance that has been stored by said memory unit when said sensing unit no longer senses that the display direction of the image on said display unit is being moved to the side of the subject.

32. An image sensing apparatus having an image sensing device for sensing the image of a subject, and a focusing lens for deciding focal point position of the subject whose image is sensed by the image sensing device, said apparatus comprising:

> display unit which is capable of displaying the image sensed by said image sensing device;
>
> moving unit which moves display direction of said display unit to a direction on the side of the subject;
>
> sensing unit which senses that the display direction of the image on said display unit is being moved to the side of the subject by said moving unit;
>
> memory unit which stores the subject distance controlled by the focusing lens when said sensing unit has sensed that the display direction of the image on said display unit is being moved to the side of the subject; and
>
> control unit which controls the focusing leas to the subject distance that has been stored by said memory unit when the sensing unit no longer senses that the display direction of the image on said display unit is being moved to the side of the subject.

* * * * *